United States Patent
Winkler

(10) Patent No.: US 6,761,391 B2
(45) Date of Patent: Jul. 13, 2004

(54) FULL ENCLOSURE PROCTECTIVE COVER FOR A GOLF CAR WITH REAR GOLF BAG STORAGE AREA COVERING

(75) Inventor: David R. Winkler, Wildwood, MO (US)

(73) Assignee: Covered Solutions, Inc., Pacific, MO (US)

( * ) Notice: Subject to any disclaimer, the term of this patent is extended or adjusted under 35 U.S.C. 154(b) by 0 days.

(21) Appl. No.: 10/053,743

(22) Filed: Jan. 22, 2002

(65) Prior Publication Data

US 2002/0145302 A1 Oct. 10, 2002

Related U.S. Application Data

(63) Continuation-in-part of application No. 09/827,327, filed on Apr. 2, 2001, now Pat. No. 6,601,904, which is a continuation-in-part of application No. 09/634,437, filed on Aug. 8, 2000, now Pat. No. 6,220,647.

(51) Int. Cl.[7] .................................................. B60J 9/00
(52) U.S. Cl. ............................ 296/79; 296/83; 296/145
(58) Field of Search ........................... 296/79, 83, 145, 296/77.1, 80, 96.2

(56) References Cited

U.S. PATENT DOCUMENTS

| | | |
|---|---|---|
| 208,564 A | 10/1878 | Bowers |
| 1,470,630 A | 10/1923 | Mahr |
| 2,689,579 A | 9/1954 | Sartori |
| 3,671,071 A | 6/1972 | Evinrude |
| 3,709,553 A * | 1/1973 | Churchill et al. ........... 296/145 |
| 4,008,874 A | 2/1977 | Conway, Jr. |
| 4,013,315 A | 3/1977 | West |
| 4,037,614 A | 7/1977 | Hines et al. |
| 4,098,536 A | 7/1978 | Mills |
| 4,469,114 A | 9/1984 | Kelley et al. |
| 4,641,879 A | 2/1987 | Kassai |
| 4,715,138 A | 12/1987 | Cherico |
| 4,773,175 A | 9/1988 | Larsen |
| 4,830,037 A | 5/1989 | Held |
| 4,864,524 A | 9/1989 | Guilfoyle et al. |
| 5,010,941 A | 4/1991 | Ross, Sr. et al. |
| 5,058,943 A | 10/1991 | Louderback |
| 5,069,481 A | 12/1991 | Strange |
| 5,072,987 A | 12/1991 | Allen |
| 5,146,967 A | 9/1992 | Chapman |
| 5,184,865 A | 2/1993 | Mohtasham et al. |
| 5,190,340 A | 3/1993 | Nuscher |
| 5,217,275 A * | 6/1993 | Ridge ........................ 296/77.1 |
| 5,259,656 A * | 11/1993 | Carroll ....................... 296/77.1 |
| 5,310,235 A | 5/1994 | Seymour et al. |
| 5,388,881 A * | 2/1995 | Spencer et al. ............. 296/77.1 |
| 5,551,745 A | 9/1996 | Huang |
| 5,588,690 A | 12/1996 | Showalter |
| 5,688,018 A | 11/1997 | Simpson |
| 5,741,041 A | 4/1998 | Sullivan |
| 5,788,317 A * | 8/1998 | Nation ....................... 296/141 |
| 5,898,962 A | 5/1999 | McNeal |
| 5,996,863 A | 12/1999 | Burke |

(List continued on next page.)

FOREIGN PATENT DOCUMENTS

DE          3517967 A1          11/1985

*Primary Examiner*—Joseph D. Pape
(74) *Attorney, Agent, or Firm*—Thompson Coburn, LLP

(57) ABSTRACT

A protective cover for a golf car is provided for enclosing at least a portion of the passenger compartment of the golf car that is covered by a canopy. The protective covering has left and right side curtains that are adapted to hang from the canopy to enclose a portion of the passenger compartment. The protective covering may include a rear bag cover that is adapted to extend over the rear golf bag storage area from the canopy. The rear bag cover is a retractable awning. The protective covering also includes a rear curtain that is adapted to be positionable between the passenger compartment and the rear golf bag storage compartment.

22 Claims, 23 Drawing Sheets

U.S. PATENT DOCUMENTS

| | | | |
|---|---|---|---|
| 6,007,134 A | 12/1999 | Weston | |
| 6,068,325 A | 5/2000 | Hughes | |
| 6,216,714 B1 | 4/2001 | Tucker | |
| 6,220,647 B1 | 4/2001 | Winkler | |
| 6,227,217 B1 | 5/2001 | Peta | |
| 6,227,603 B1 | 5/2001 | Brock | |
| 6,367,181 B1 | 4/2002 | Skoog | |
| 6,439,637 B1 * | 8/2002 | Tyrer | 296/79 |
| D463,225 S | 9/2002 | Winkler | |
| D463,226 S | 9/2002 | Winkler | |
| 2002/0027373 A1 | 3/2002 | Winkler | |
| 2002/0033402 A1 | 3/2002 | Winkler | |
| 2002/0041106 A1 | 4/2002 | Winkler | |

* cited by examiner

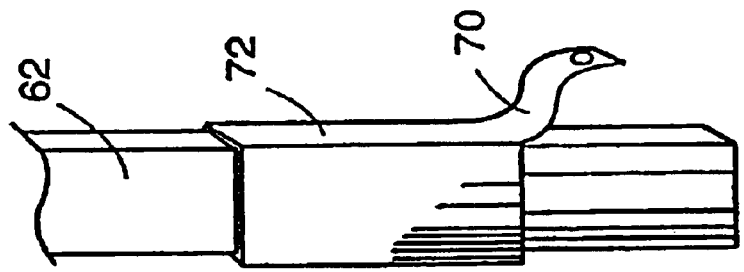
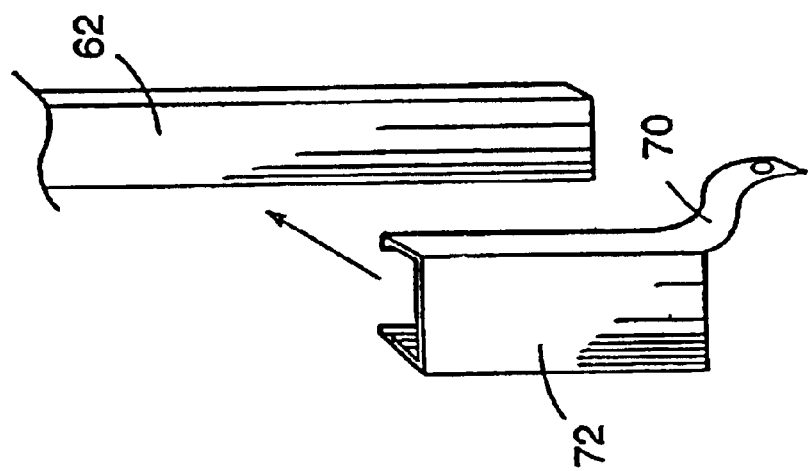
Fig. 5

FULL ENCLOSURE PROCTECTIVE COVER FOR A GOLF CAR WITH REAR GOLF BAG STORAGE AREA COVERING

RELATED APPLICATION DATA

This application is a continuation-in-part of application Ser. No. 09/827,327, filed Apr. 2, 2001, now U.S. Pat. No. 6,601,904, which is a continuation-in-part of application Ser. No. 09/634,437, filed Aug. 8, 2000, now U.S. Pat. No. 6,220,647.

BACKGROUND OF THE INVENTION

This invention relates to coverings and awnings for golf cars. More, specifically, the present invention relates to a full enclosure protective covering for a golf car with a rear golf bag storage area cover. The full enclosure protective covering encloses a passenger compartment of the golf car and the rear golf bag storage area cover covers over golf clubs, which may be stored in the rear of the golf car behind the passenger compartment.

A standard golf car has an area for stowage or storage of golf clubs and other equipment at the rear of the car. While the car's roof covers persons riding in the car, it leaves the equipment in the stowage area uncovered. Golfing equipment can be very expensive, and it is undesirable for it to get wet because of rain. As such, a cover extending over the rear stowage area of the car is desirable. However, ready access by a golfer to his equipment is essential, so the cover should not obstruct the golfers ability to reach for clubs as needed. Further, if rainy conditions are not present, the cover is not needed and must be moved out of the way. There exist retractable covers that extend over the car's stowage area, but they often do so in a cumbersome fashion. While some covers, when deployed, may do an adequate job in keeping rain off the equipment, they do not fold away in a neat, compact fashion when retracted after use. Still other disadvantages found in the prior art designs include inconvenient mounting arrangements for attaching the cover to the golf car, supporting frameworks which are cumbersome and unduly complicated and which do not adequately support the fabric, and inadequate mounting arrangements for securing the cover to the golf car at or near the canopy top thereof. This is especially a problem in that there are several major manufacturers of golf cars who have varying arrangements for their canopy tops, some of which have curvilinear edges not readily suited to alignment with a standardized bracket member.

Furthermore, as there is concern in providing clearance for the removal and replacement of golf clubs from the golf bags as they are carried near the rear portion of the golf car, these canopy tops are generally shortened and do not extend into the area immediately above the golf bag compartment. This then provides a challenge for the cover in that it must conveniently extend to provide adequate rain cover for golf bags but yet be readily collapsible up and out of the way of the bags and their clubs. As a result, care must be taken in designing and implementing a supporting framework. In other words, the framework must be large enough to allow for it being extended a substantial distance behind the rear portion of the top assembly which necessarily makes it "substantial" having some degree of relative size which increases its weight and complexity. With this added weight and complexity, mounting and operation become important issues as the cover must give the appearance and feel of a quality product in this luxury setting.

Additionally, it is often desired to provide the golf car with a protective covering that protects the inside of the golf car or the passenger compartment from the elements. However, conventional approaches to protecting or enclosing the passenger compartment have many disadvantages. Conventional protective coverings are generally designed to cover over the entire golf car. The coverings are typically arranged as rectangular shaped bag-like structures that drape over the entire golf car, including the rear golf bag storage area, from the canopy. The typical coverings have a flat bottom panel that is placed over the canopy, and the four generally rectangular panels cover over the sides and front and back of the golf car. Some of these types of coverings render the golf car not usable when the covering is installed. Although some designs of these coverings have doors provided through the sides to allow use of the golf car with the protective covering, their use is nevertheless cumbersome as the coverings tend to also cover over the rear golf bag storage area thereby rendering it inaccessible. Additionally, the traditional coverings do not typically allow the golf car user to selectively remove panels as may be desired depending upon the climate and the golf car's mode of use. Also, the traditional coverings cannot be aesthetically and effectively integrated with rear golf bag storage area covers.

SUMMARY OF THE INVENTION

Among the advantageous aspects disclosed herein is the provision of a retractable awning for the rear equipment stowage area of a golf car. The awning is comprised of a framework having a fabric covering extended over a plurality of U-shaped rib members joined in pivoting relationship at their ends at a common pivot point. The rib members are moveable relative to each other so that the awning can be moved in fan-like fashion between an open, deployed position to a closed, retracted position. A first top rib member forms the top, forward lateral edge of the awning, and each successive rib member supports a portion of the fabric to give structural shape to the awning in its deployed state. Each successive rib member has an incrementally smaller dimension than its preceding rib member such that all the rib members can be nested together in a common plane when the awning is in the closed retracted position. Sleeves are disposed on the inner surface of the fabric to receive the rib members which allows the fabric to deploy smoothly over the framework. A fabric flap is provided with the awning to enable the loose awning fabric to be gathered neatly together when the awning is held against the rear edge of the carts roof in the closed retracted state.

Several arrangements are shown for mounting the awning to the golf car. In a first arrangement, the awning is attached to the rear of a golf car by fastening the top rib member to the rear edge area of the roof of the golf car. The respective pivot points of the rib members are supported against the car's vertical support posts. Alternately, the first top rib member is supported along its vertical length to the car's vertical support post with the pivot points being freely suspended. The support for the first top rib member may be provided in a number of ways. One option is to provide two support brackets which extend between each side of the first top rib member and its corresponding upstanding support arm provided by the golf car manufacturer for supporting the preexisting canopy top. In this arrangement, a transition plate is provided attached to the medial portion of the first top rib member with an upturned flange with cushioning for being tucked up under the overhanging lip of the canopy top. This provides an overlapping arrangement which may either be spaced apart or urged against each other to allow for a smooth and clean transition between the add-on awning cover and the golf car.

Depending upon the choice made by the designer, the awning may thus be spaced apart from the canopy top or urged against it by locating the mounting brackets appropriately. As can be appreciated, switching between these alternatives is readily available by loosening and relocating the brackets.

As disclosed herein, another alternative for mounting the awning cover to the golf car includes providing a top mounting bracket which itself is substantially U-shaped and which extends between upstanding support members of the canopy top on opposite sides of the car and to which it may be conveniently bolted in fixed position. As a typical golf car does not provide a support framework including a bracket or other member extending across the back of the canopy top, this top mounting bracket provides a fixed and solid connection point for the transition plate. Thus, the transition plate may itself be conveniently bolted to the top mounting bracket which in turn is bolted to the upstanding support members of the golf car itself. This provides a solid bolted connection for supporting the awning cover to the integral framework supporting the canopy top. In several prior art designs, covers are secured to the canopy top itself instead of any supporting framework which is not particularly desirable in that the canopy tops are universally provided as molded plastic members. Thus, prior art covers attached to the molded plastic canopy top are not nearly as securely mounted to provide the solid and substantial mounting of the present invention. This can be important in that many golf cars are rented and subject to abuse by their users.

Among the other advantages set forth in the disclosure is the provision of a retractable awning for attachment to the rear of a golf car to protect equipment stored in the car's stowage area. The disclosure also provides a retractable awning having a framework comprised of rib members that nest together in planar alignment when in a closed retracted position, and a retractable awning having a framework surrounding substantially the periphery of the fabric cover. Additionally, a retractable awning is disclosed having a transition plate for transitioning between the fabric awning and the canopy top of the golf car to thereby allow the awning to be spaced further rearwardly to thereby optimize its positioning over the golf bag compartment area of the car. Additionally, a retractable awning is disclosed with a supporting framework including a top mounting bracket which itself is substantially U-shaped for being bolted to opposite sides of the golf car upstanding support members and the transition plate to thereby provide a solid bolted connection between the forward edge of the awning and the supporting framework of the golf car. Additionally, a retractable awning is disclosed having a framework including a first rib member at the forward edge of the fabric cover which itself is secured directly to the upstanding support members by a pair of brackets on each side of the golf car to thereby securely fasten the awning cover to the golf car without being secured to the canopy top of the golf car. Also, a retractable awning is disclosed having a framework comprised of a nesting plurality of U-shaped rib members for readily being moved between an extended deployed position and a retracted stored position.

Among the aspects of the present invention is the provision of a protective covering for a golf car having the advantages of a full enclosure protective cover and a rear golf bag storage area cover or bag cover.

In one aspect of the present invention, the protective covering includes left and right side curtains that are adapted to hang from the canopy to enclose a portion of the passenger compartment and a rear bag cover that is adapted to extend over the rear golf bag storage area from the canopy. The protective covering may include a rear side flap that is adapted to extend between each of the side curtains and the rear bag cover. In this way, the rear side flap may be arranged to extend downward a distance sufficient to cover over an area between the rear golf bag storage area and the passenger compartment while permitting access to the area between the rear golf bag storage area and the passenger compartment from a side of the golf car.

In another aspect of the present invention, a protective covering for a golf car is provided having left and right side curtains and a rear curtain extending between the left and right side curtains. Each of the left and right side and rear curtains is adapted to hang from the canopy to enclose a portion of the passenger compartment. The rear curtain is adapted to hang from the canopy in a manner such that the rear curtain is positioned between the passenger compartment and the rear golf bag storage area adjacent a pair of spaced apart support posts that are located at a rear of the canopy. In this way, the rear area of the golf car including the rear golf bag storage area is unobstructed by the covering, and a user may easily access the rear golf bag storage area and/or the baskets and accessories generally located to the side and rear of the golf car between the passenger compartment and the rear golf bag storage area.

Another aspect of the present invention is the provision of a protective covering for a golf car having left and right side curtains, a rear curtain extending between the left and right side curtains, and a rear bag cover adapted to extend over the rear golf bag storage area from the canopy. Each of the left and right side curtains is adapted to hang from the canopy to enclose a portion of the passenger compartment. The rear curtain is adapted to be positionable between the passenger compartment and the rear golf bag storage area adjacent a pair of spaced apart support posts that are located at a rear of the canopy. Preferably, the rear bag cover is of the type that is moveable between a retracted position in which the rear golf bag storage compartment is exposed and deployed position in which the rear bag cover covers over the rear golf bag storage compartment.

As will become apparent to those skilled in the art, the present invention provides a protective covering for a golf car that is convenient to use and aesthetically pleasing. The protective cover of the present invention also provides the user with desired accessibility to items on the golf car while protecting the passenger compartment from the elements as needed. These and other objects, advantages and novel features of the present invention will be set forth by example and not limitation in the drawings figures and the detailed description of the preferred embodiment which follow.

DESCRIPTION OF THE DRAWINGS

FIG. 5 is a view showing a mounting embodiment in which the bottom portion of the awning is attached to a support post of a golf car;

DESCRIPTION OF THE INVENTION

Figure 1:
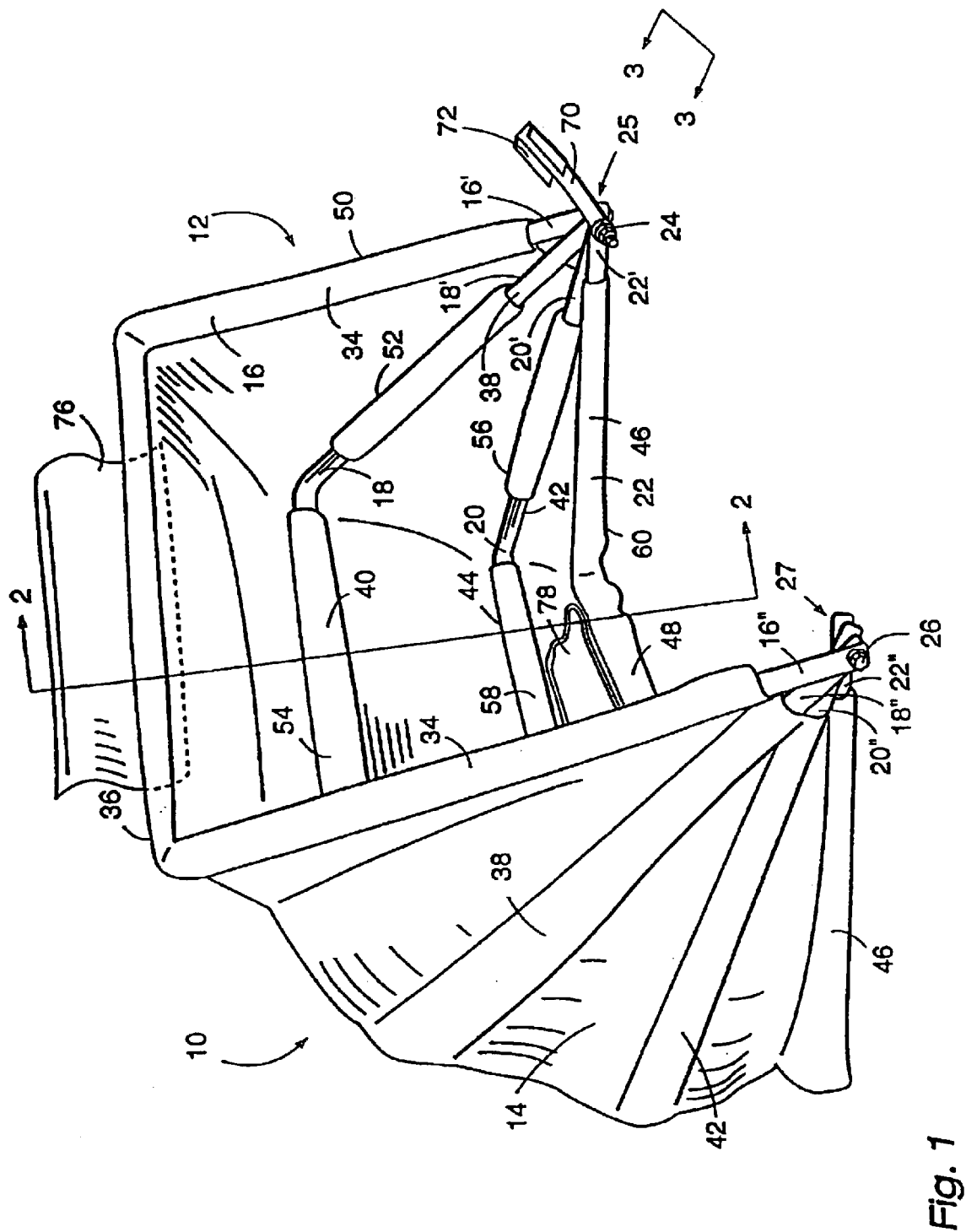
FIG. 1 is a perspective view of the awning in a partially open state.
Figure 3:
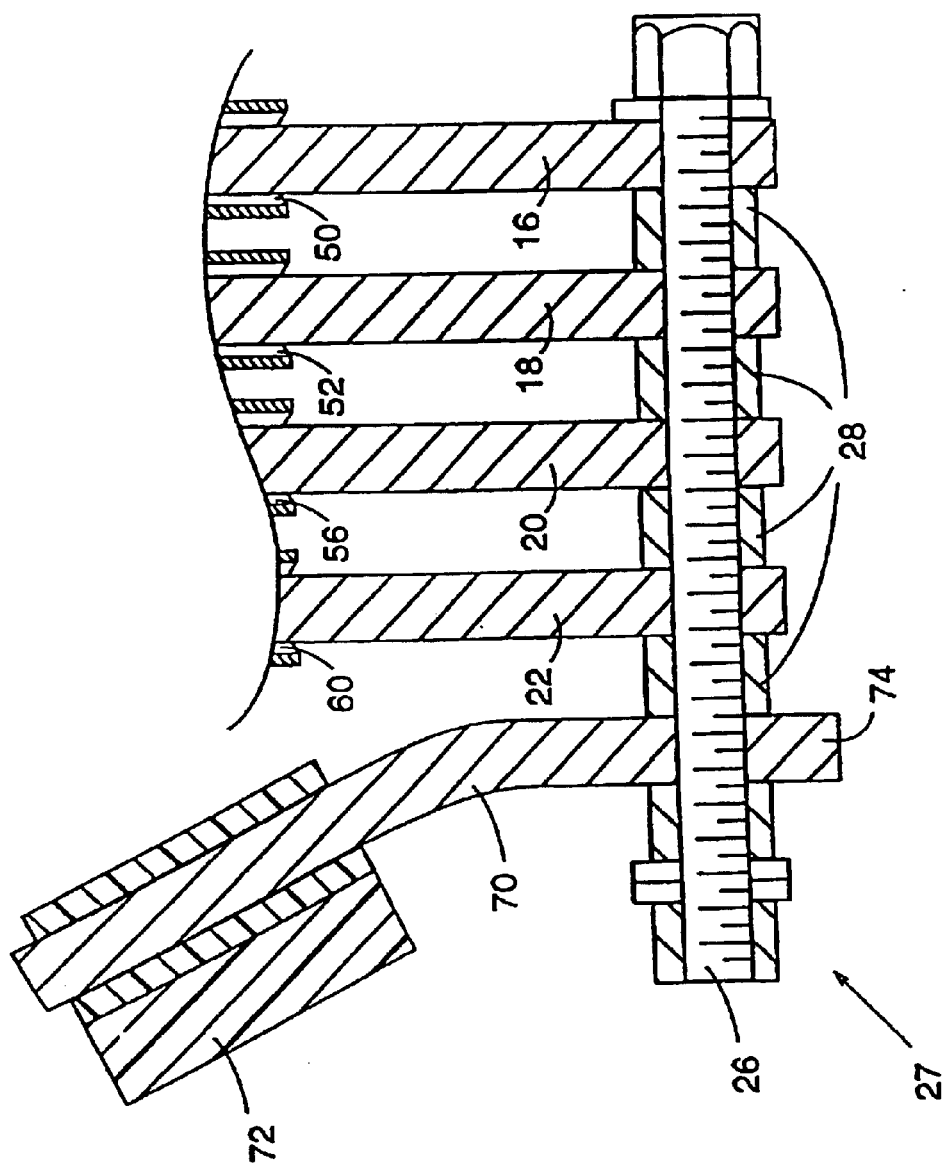
FIG. 3 is a cross-sectional view of a pivot point of the awning framework taken in side elevation along lines 3-3 in FIG. 1.

The awning attachment of the present invention, which is generally indicated by the reference numeral 10, is shown in FIG. 1. It is comprised of a framework 12 which supports a fabric covering 14. Framework 12 is comprised of a series of U-shaped rib members 16, 18, 20 and 22, each having ends 16', 16", 18', 18", 20', 20", 22' and 22", respectively. While additional, or fewer, rib members may be employed, four rib members provides the optimum number to adequately provide support for the fabric covering and give it a pleasing, gently arcuate shape. The respective rib member ends are connected together by bolts or pins 24 and 26, as shown in FIGS. 1 and 3, to create common pivot points 25 and 27, respectively, by which the rib members may be moved relative to each other. Bushings 28 are provided along bolts 24 and 26 between the rib member ends to provide adequate separation thereof to facilitate relative movement of the rib members when fanned out. A sufficient amount of fabric covering 14 is provided to enable the awning, when deployed, to extend arcuately from the rear edge section 30 of the roof of the car to a point slightly beyond the rear edge of the car, and to a level approximately even with the seats of the car, so as to effectively cover the top of a golf club bag 32 held upright in the storage compartment as shown in FIG. 4.

Figure 2:
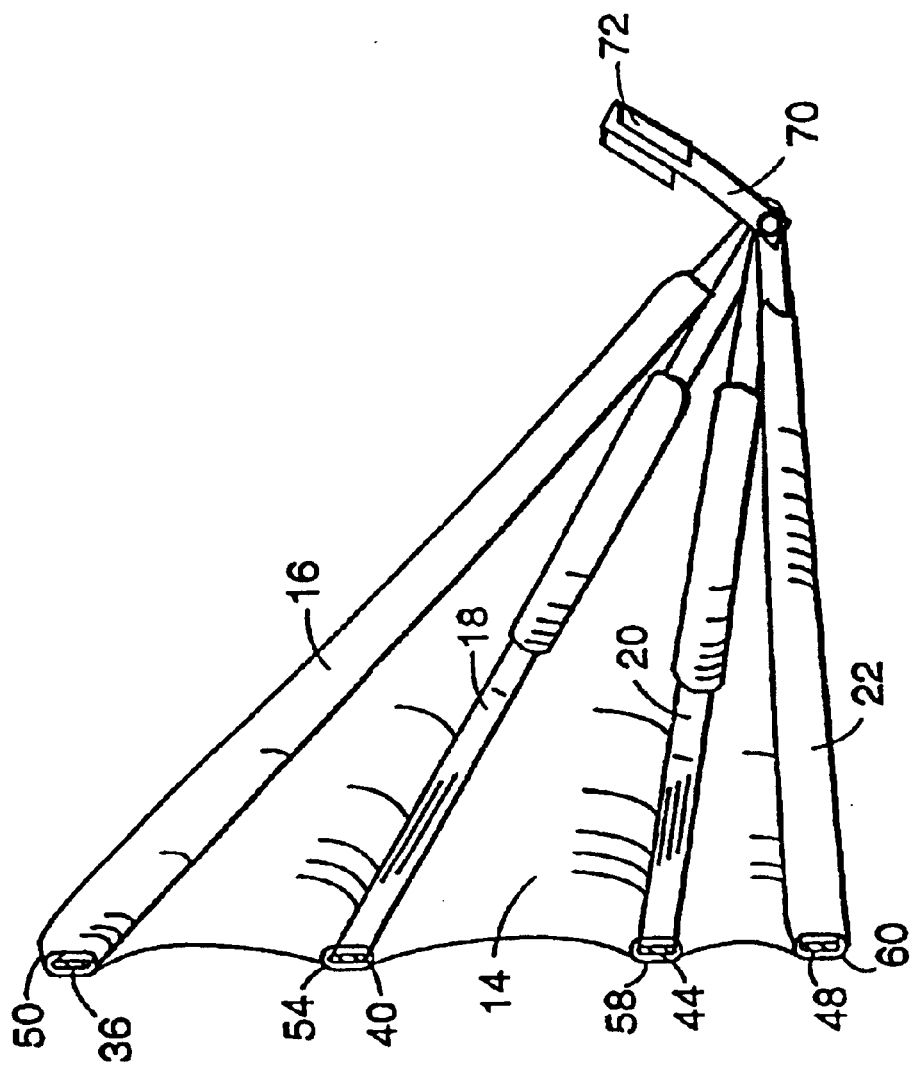
FIG. 2 is a cross-sectional view of the awning framework taken in side elevation along lines 2-2 in FIG. 1.

Sleeves are disposed on the forward and rear edges and underneath side of fabric cover 14 by sewing or the like to receive the rib members as shown in FIGS. 1 and 2. The sleeves allow a certain freedom of movement of the fabric cover along the rib members to facilitate deployment and retraction of the awning. Sleeve 50 is formed around the perimeter front lateral edge of fabric cover 14 and receives arms 34 and cross piece 36 of rib member 16. Sleeves 52 and 54 receive arm 38 and cross piece 40, respectively, of rib member 18. A corresponding sleeve 52 on the opposite interior side of fabric 14 receives the other arm 38. Similarly, sleeves 56 and 58 receive arms 42 and cross piece 44, respectively, of rib member 20. Sleeve 60 is formed around the perimeter rear lateral edge of fabric cover 14 and receives arms 46 and cross piece 48 of rib member 22.

Figure 6:
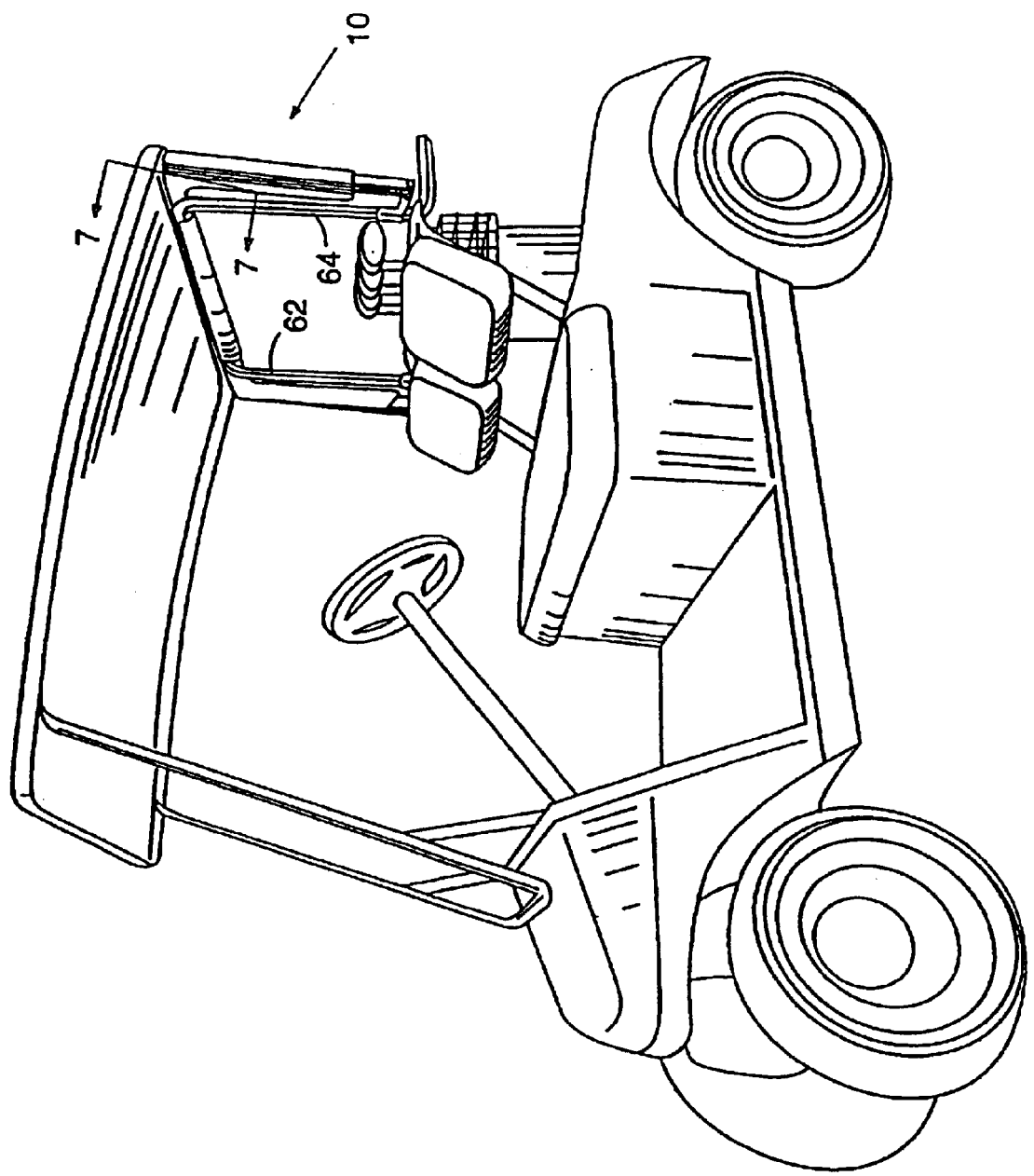
FIG. 6 is a perspective view of the awning in a retracted state on the back of a golf car.

Each successive rib member after the first top rib member has an incrementally shorter dimension with respect to both its length and width so that the entire framework may lie substantially flat in a nesting relationship when in the closed retracted position shown in FIG. 6. As further shown in FIG. 1, rib member 16 comprises arms 34 and cross piece 36. Rib member 18 comprises arms 38, which are around ½ to one inch shorter than arms 34 of rib member 16, and cross piece 40, which is around one to two inches shorter than cross piece 36 of rib member 16. Likewise, rib member 20 comprises arms 42 and cross piece 44, which are respectively around ½ to one inch shorter than arms 38 and around one to two inches shorter than cross piece 40 of rib member 18. Further, rib member 22 comprises arms 46 and cross piece 48, which are respectively around ½ to one inch shorter than arms 42 and around one to two inches shorter than cross piece 44 of rib member 20. The dimensions may vary due to the thicknesses of the rib members and fabric cover 14 held between the rib members. This arrangement allows each successive rib member to be nested within the forwardly preceding rib member in a planar relationship. Rib members 16-22 substantially flat in cross section which facilitates their side-by-side placement at pivot points 25 and 27 and also allows the nesting relationship shown in FIGS. 3 and 6. Bushings 28 keep the rib members spaced apart to provide room for the fabric sleeve material sandwiched between the rib members.

Figure 4:
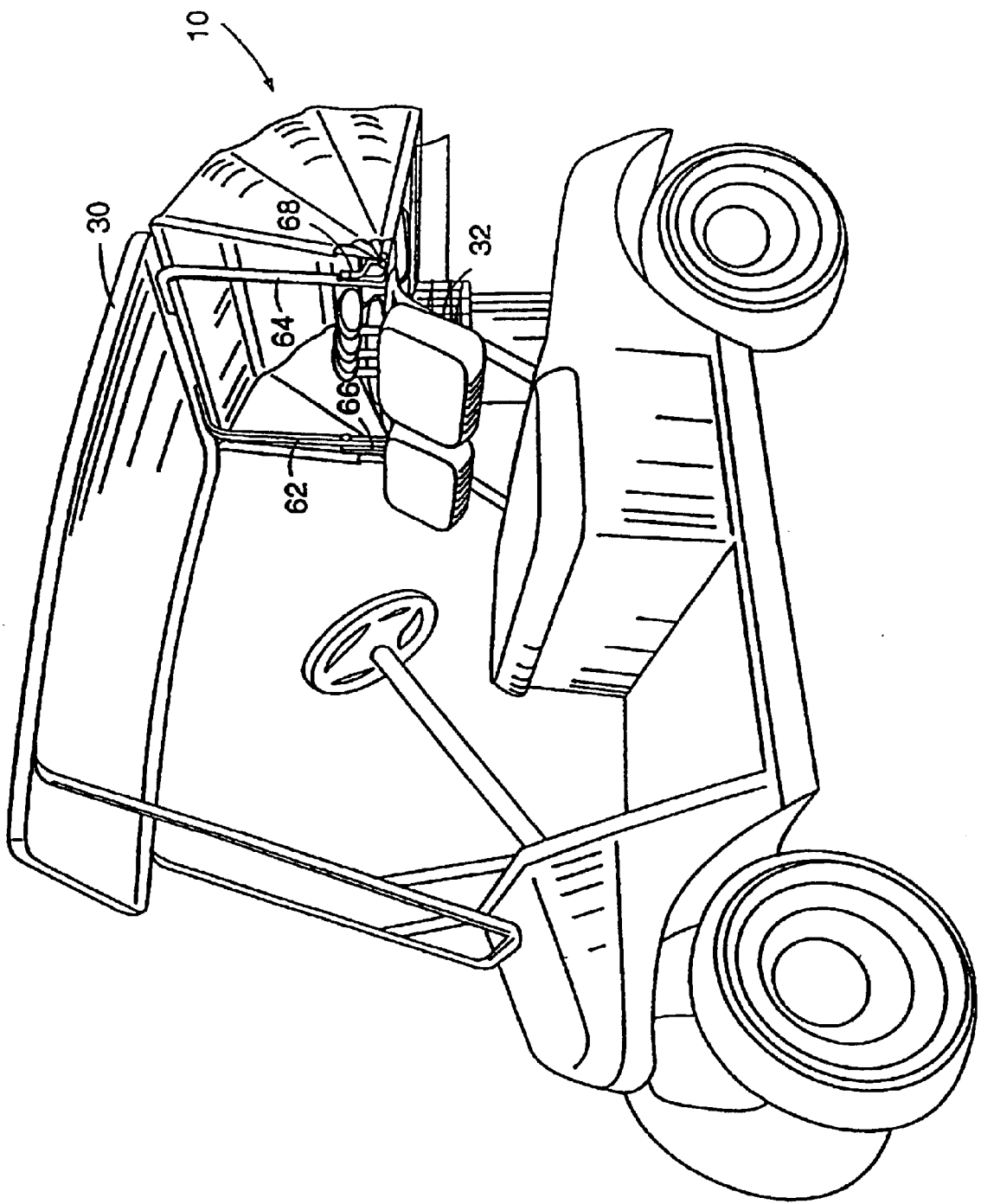
FIG. 4 is a perspective view of the awning in a deployed state on the back of a golf car.

The awning attachment is fitted on to a golf car as shown in FIG. 4. The forward edge of the frame structure, at the top edge of rib member 16, is connected to the underneath side of the rear section 30 of the car's roof. Such connection can be made by providing drill holes in both the rib member and the roof to allow screwing or bolting the rib member directly into the roof section, or by any other appropriate connection means known to those skilled in the art. Preferably, the rib member should lie flush with the rear edge of the roof so that the awning remains as unobtrusive as possible. Due to the various different manufacturers of golf cars, and the various different roof designs produced by each, it may be difficult to attach the rib member flush up against the edge of the roof. This is because some roof edges may be non-rectilinear, and may have curved edges. In such instances, the rib member can not adjoin the roof edge in an aesthetically pleasing way, and, further, may not even be capable of being directly attached to the roof edge.

Figure 11:
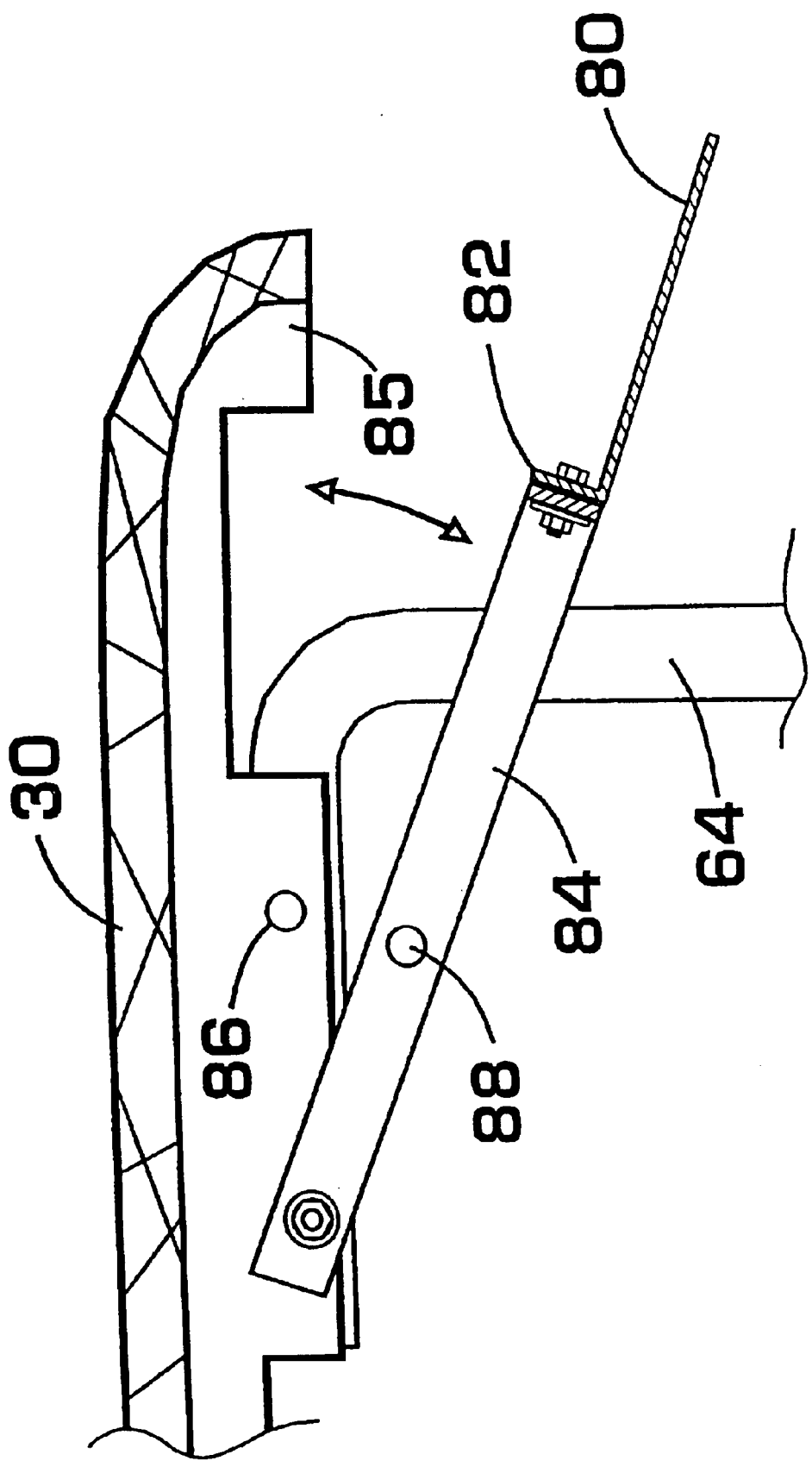
FIG. 11 is a cross-sectional view of the rear edge section of the roof of the car showing the mounting bracket and transition plate for the alternate mounting arrangement shown in FIG. 8.
Figure 12:
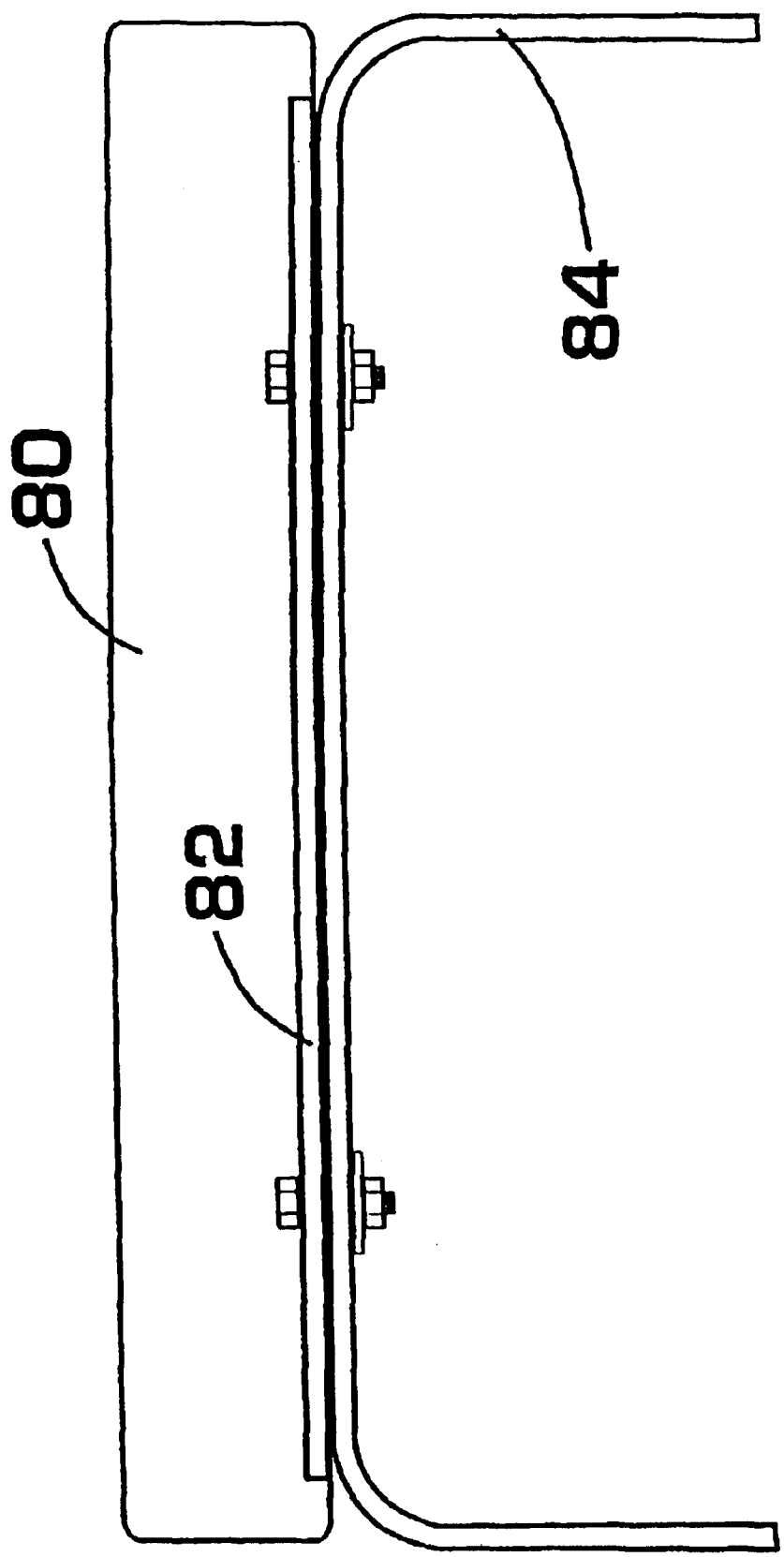
FIG. 12 is a top plan view of the mounting bracket and plate of FIG. 11.

To provide a surface for attachment of the awning at the rear edge of the car roof, an extended transition plate member 80 against which rib member 16 may be secured is supplied. Plate member 80 is held in place by U-shaped top mounting bracket 84 as shown in FIGS. 11 and 12. Bracket 84 is secured to the underneath side of the roof of the golf car which typically forms an interior flange 85 around the rear edge 30 of the roof. The shape of bracket 84 may be modified to accommodate the perimeter shape of the roof, which may be rectilinear or have rounded edges. Roof flange 85 can be provided with a plurality of apertures 86 around its perimeter, while bracket 84 may be provided with correspondingly placed apertures 88 to secure bracket 84 to the roof flange 85 by bolting or other appropriate fastening methods as shown in FIG. 11. Plate member 80 has a flange 82 at its forward end for connection with bracket 84 as shown in FIG. 12. Bracket 84 is optimally dimensioned such that flange 82 will be held between bracket 84 and roof flange 85.

The frame is further secured to the car's upright, vertical support posts 62 and 64 through mounting clamps 66 and 68. These mounting clamps, as shown in FIG. 5, each comprise a metal strap 70 having a clamp 72 for engaging the cars support post 62 or 64. Clamp 72 may comprise an open faced C-shaped channel having inwardly biased edges for holding support post in tight engagement. Alternately, a clamp having a tightening fastener, such as a threaded C-clamp, may be used. Further still, a clamp that surrounds the vertical post may be employed, and can be configured with a square or round opening to accommodate the appropriate geometrical cross section of the support post. Mounting clamps 66 and 68 each have an end 74 for mounting at pivot points 25 and 27 for the rib members of framework 12 as shown in FIG. 3. It is to be understood that the configuration of the vertical support posts of cars of different manufacturers may vary, with the posts being set wide in some car models and set narrow in other car models. As such, the distance of the pivot points 25 and 27 to the cars supports will vary. To accommodate such different dimensions, the mounting clamps may be provided with different lengths of straps 70.

Figure 8:
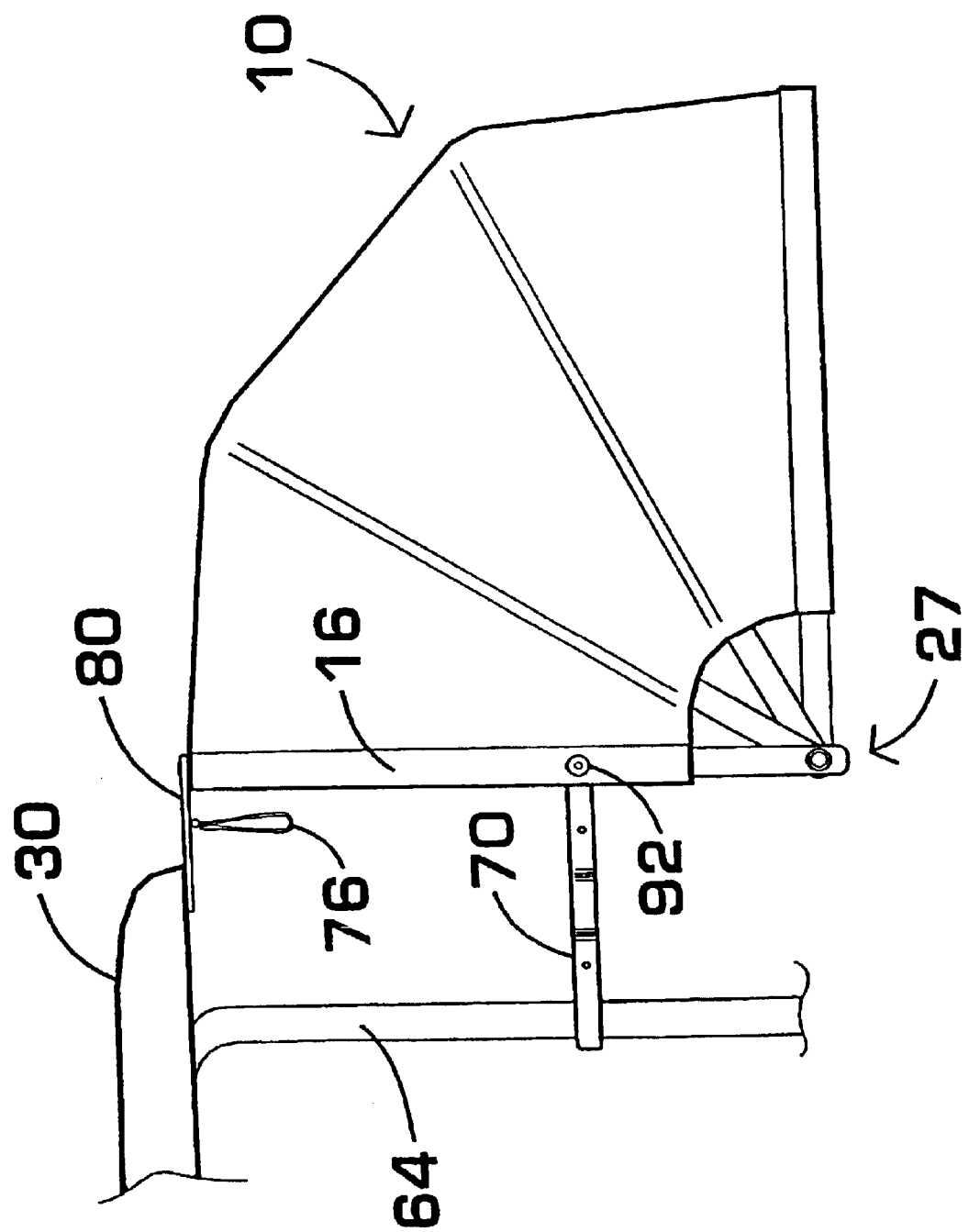
FIG. 8 is a view in side elevation of the awning mounted on the car, in which alternate mounting arrangement is shown.
Figure 9:
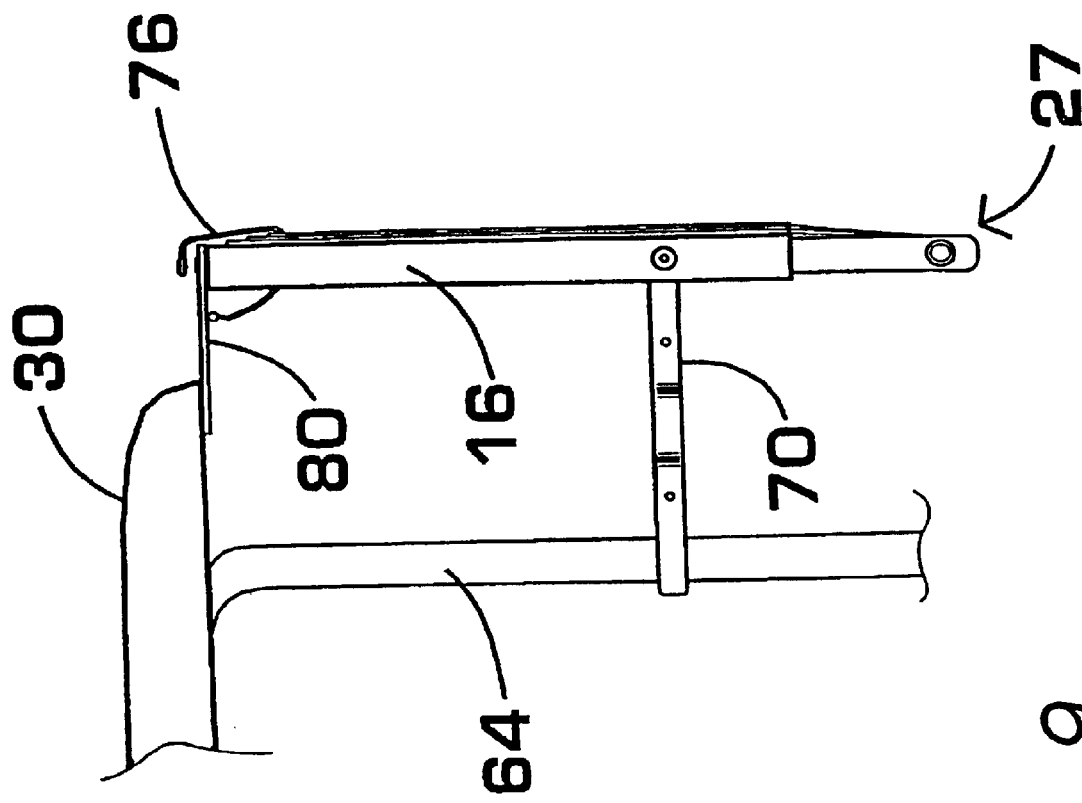
FIG. 9 is a view in side elevation of the awning mounted on the car in the arrangement of FIG. 8, showing the rib members retracted.
Figure 13:
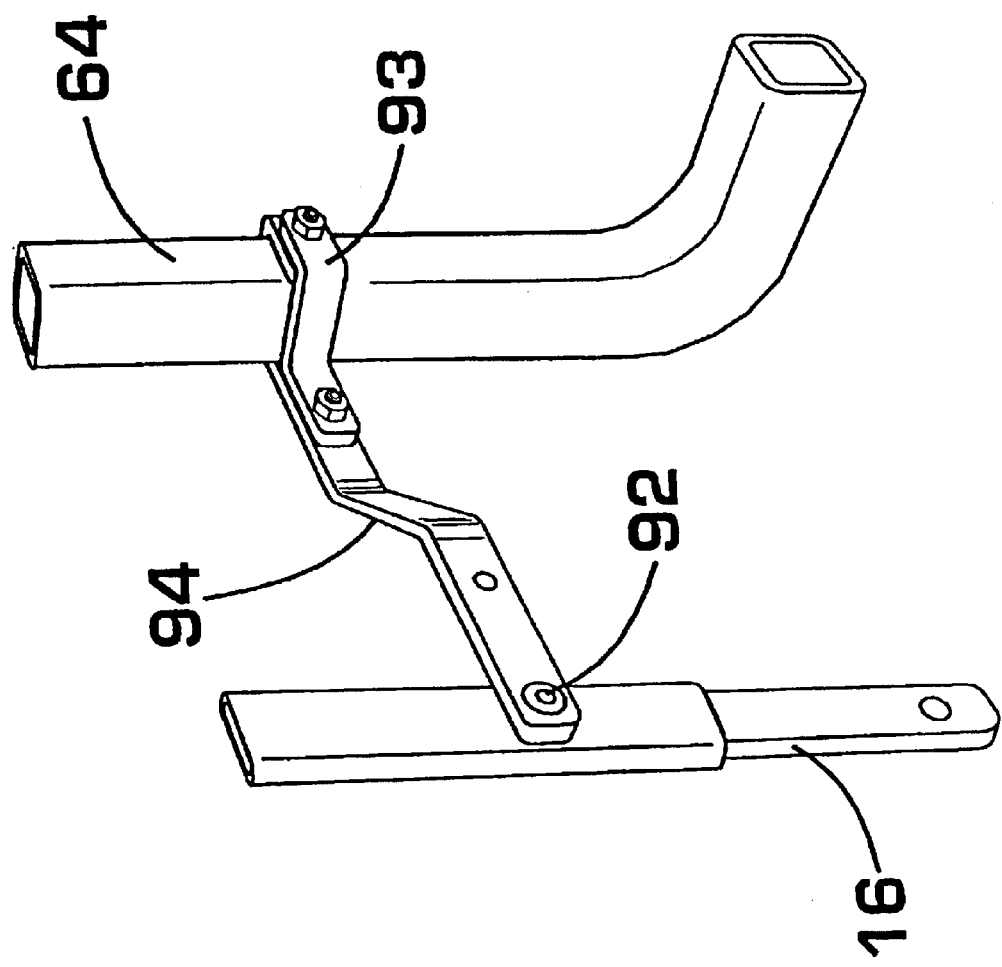
FIG. 13 is a perspective view of the bracing arm which connects the rib member of the awning to the vertical support post of the car.

The frame may alternately be mounted to the vertical support posts of the golf car from a position on rib member 16 remote from pivot points 25 and 27. In such cases, connecting metal straps 70 would be moved from the pivot point (as shown in FIG. 3) and instead be positioned along a median portion of rib member 16 as shown in FIGS. 8 and 9. This particular positioning of strap 70 on rib member 16 further provides a greater degree of overall stability to the attached awning, as pivot points 25 and 27 are sufficiently stable due to the interconnection of the rib members and do not need supplemental stabilization. Strap 70 may be simply connected to rib member 16 by bolting 92 or other appropriate fastener. The remote end 90 of strap 70 may be fastened to the car's vertical support posts 62 and 64 by direct bolting, or may be provided with a clamp 93 for engagement around the support post. To accommodate the different spacing of the vertical support posts on cars of different manufacturers, strap 70 may be configured with an offset angle 94 as necessary to reach to a vertical post set wider than the awning as shown in FIG. 13. Likewise, the offset angle can be configured to connect to a vertical post set narrower than the awning.

Figure 7:
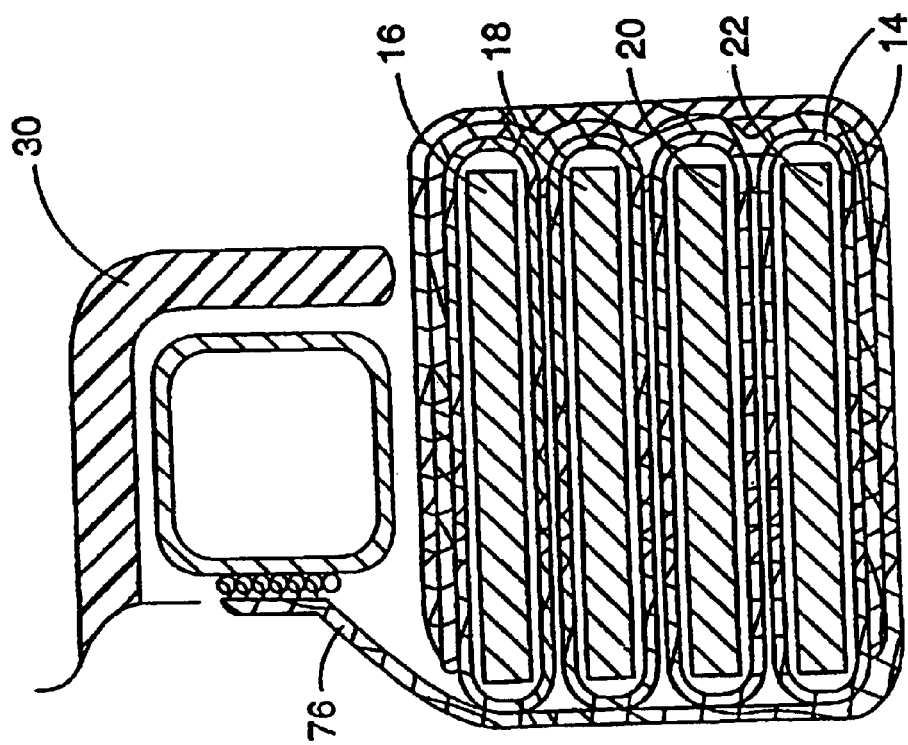
FIG. 7 is a cross-sectional view of the nested rib members comprising the awning framework taken in side elevation along lines 7-7 in FIG. 6.

To hold the loose fabric material of cover 14 in a neat bundle when the awning is in the closed, retracted position, a gathering flap 76 is provided on the top section of cover 14. FIG. 1 shows flap 76 extending along the substantial width of cross piece 36 of rib member 16, being secured to the fabric by sewing or the like along that end. The free end is provided with snaps or hook and loop fastening material. When the awning is in the open, deployed position, gathering flap 76 lies loosely on the top of the fabric covering 14 on the back of the awning. It is not long enough, however, so that it dangles below the rear bottom edge of the awning. When the awning is folded up into its closed, retracted position, the gathering flap is wrapped around the nested rib members and secured by its snaps or hook and loop fastening means to corresponding fastening means on the forward lateral edge of the framework of the awning or to the underneath side of the roof of the car as shown in FIGS. 6 and 7.

Figure 10:
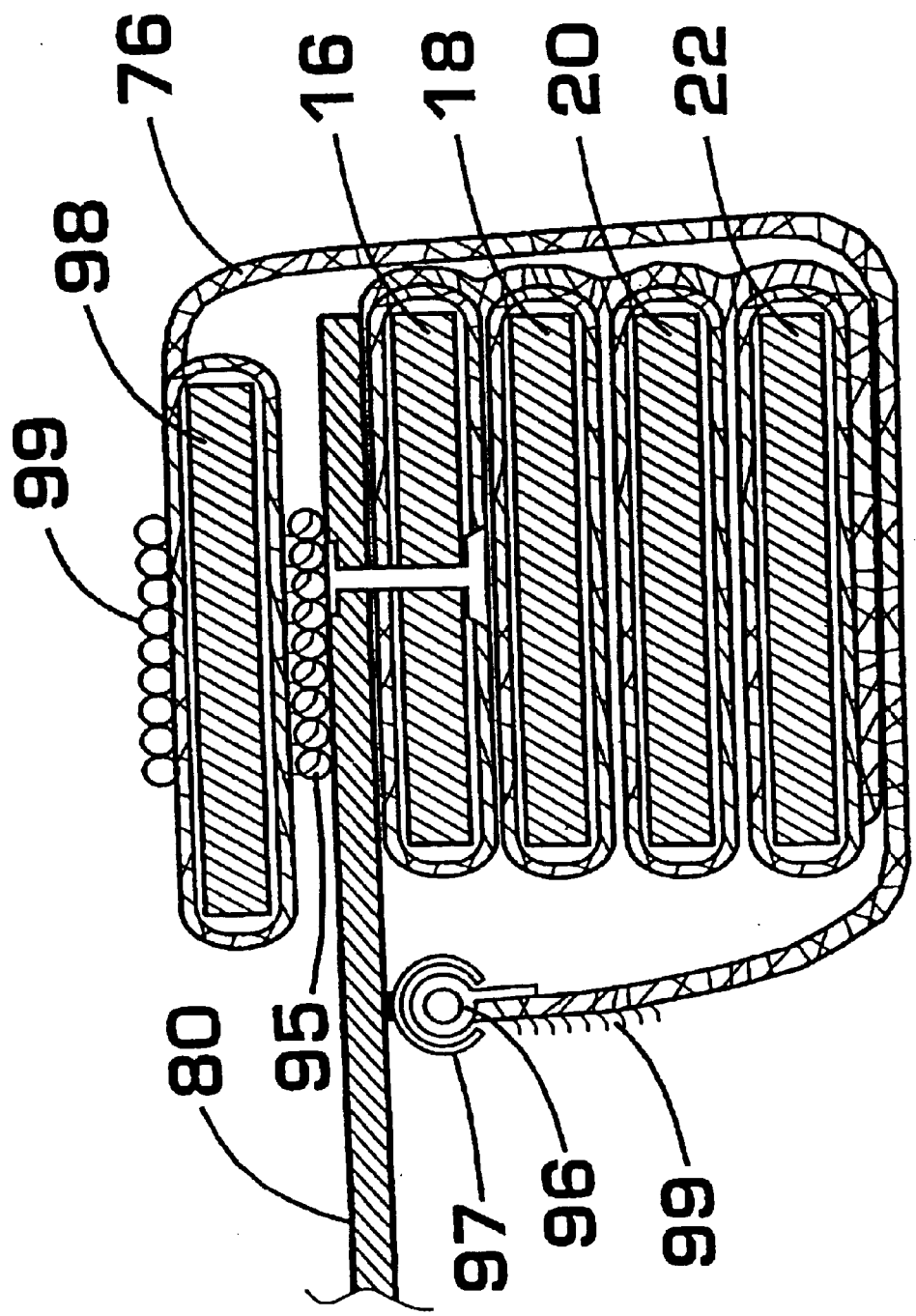
FIG. 10 is a cross-sectional view of the nested rib members in FIG. 9.

When the awning is attached to the golf car by using extended transition plate member 80, the orientation of gathering flap 76 may be reversed, by securing the base end 91 underneath the plate member 80 and configuring the flap 76 to be drawn around the nested rib members and secured to the top of plate member 80, as shown in FIG. 10, by appropriate fastening means previously described. The gathering flap 76 may be constructed to be removable from its securement under plate member 80 using various fastening means, such as a zipper, hook and loop fastening means, etc. For a reinforced connection, flap end 91 may be provided with a gather formed along its edge by overlapping the material of the flap several times and sewing the overlaps together. Alternatively, the flap edge could be formed with a narrow sleeve containing a dowel or webbing member 96. A C-channel 97 may be secured underneath the plate member 80 to slidably receive the gather or webbing member of the flap end. A stiffener member 98 may be provided at the remote end of flap 76 to provide a certain amount of weight and rigidity so the flap end will be resistant to curling and be made easier to handle. Also, a fastener, for example a hook and loop fastener, 99 may be provided at the opposite flap ends so that the flap 76 may be doubled back on itself when not in use.

By having the gathering flap extend the substantial width of the framework, it avoids unsightly bulging out of material that would be present if narrow gathering strips were instead used. As an additional advantage, the wide gathering flap allows for a clear vinyl pocket for printed material to be placed therein which presents a useful marketing tool for advertisers during golf tournaments.

Figure 14:
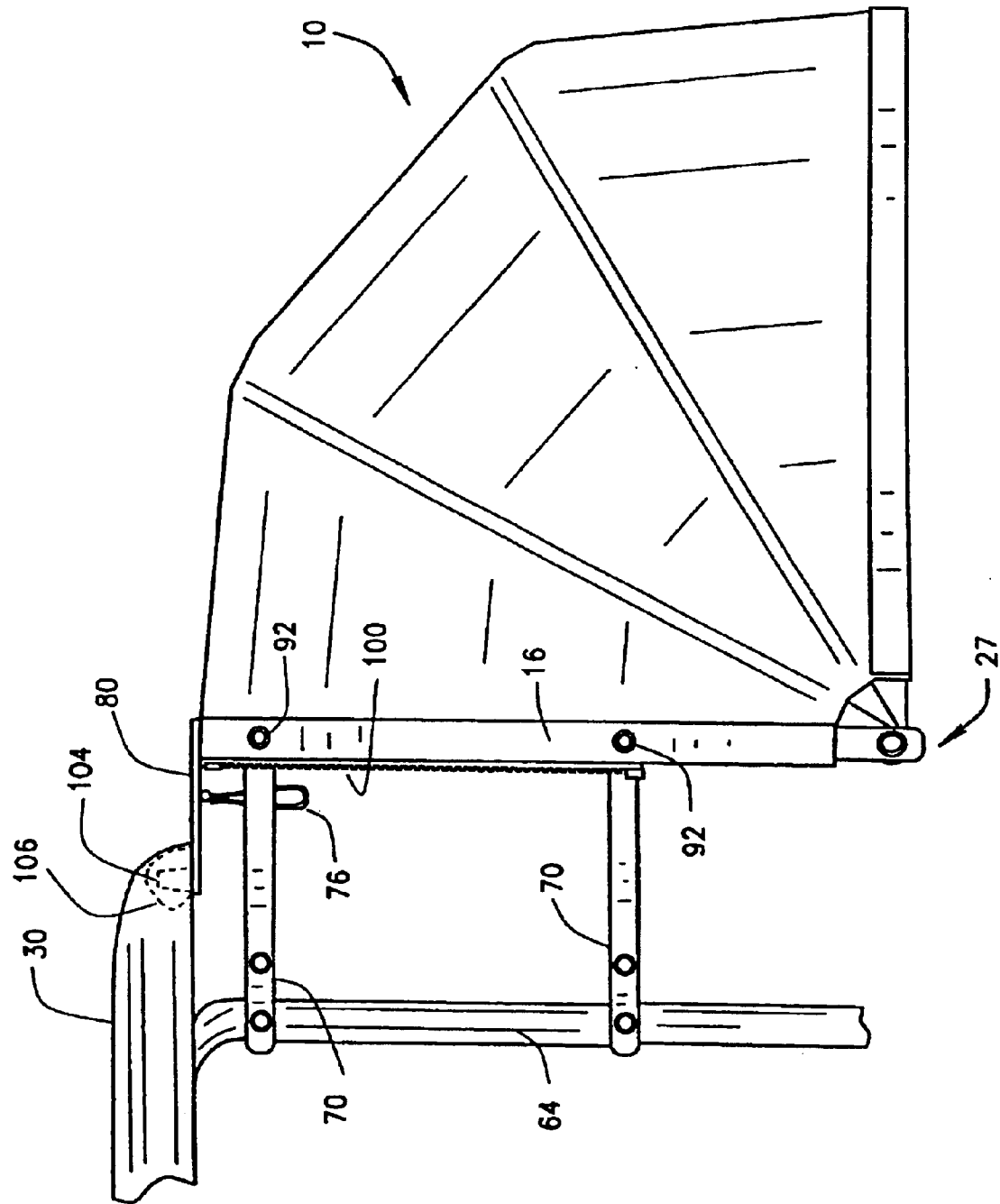
FIG. 14 is a view in side elevation of the awning mounted on the car with a pair of bracing arms or brackets at each side thereof.
Figure 15:
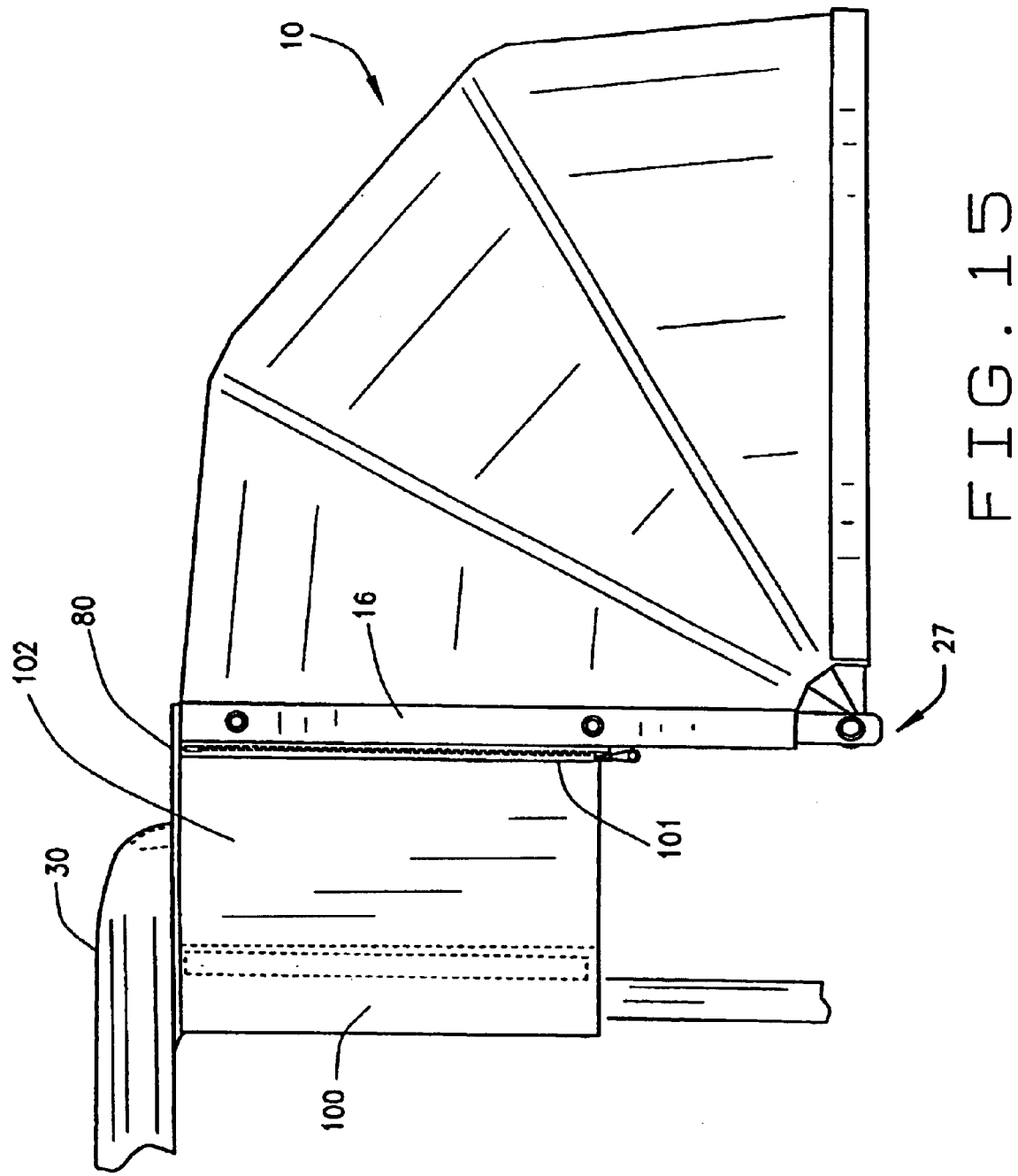
FIG. 15 is a side elevational view of the awning similar to that shown in FIG. 14 with the addition of fabric side panels zippered in place.

Referring to FIGS. 14 and 15, a zipper 100 or hook and loop material may be provided along an edge of the fabric cover for the selective placement of a fabric panel 102, as desired for shielding from view the connecting metal straps 70 which may be used to support the awning cover from the vertical support posts 62, 64. Furthermore, in the arrangement as shown in FIGS. 14 and 15, the transition plate 80 may not be secured to the rear section 30 of the car's roof and instead may merely have an upstanding flange 104 with a protective cushion covering 106 for resiliently engaging the lip of the golf car top 30. In this arrangement, the straps 70 provide the sole means of support for the awning cover from the vertical posts 62, 64. Although an arrangement is shown in FIGS. 14 and 15 indicating that the transition plate 80 and its upturned flange 104 may be conveniently urged against the canopy top 30 of the golf car, this need not be the case as the straps 70 may merely be repositioned to provide a space between the flange 104 and cushioning member 106 and the golf car top 30.

Figure 17:
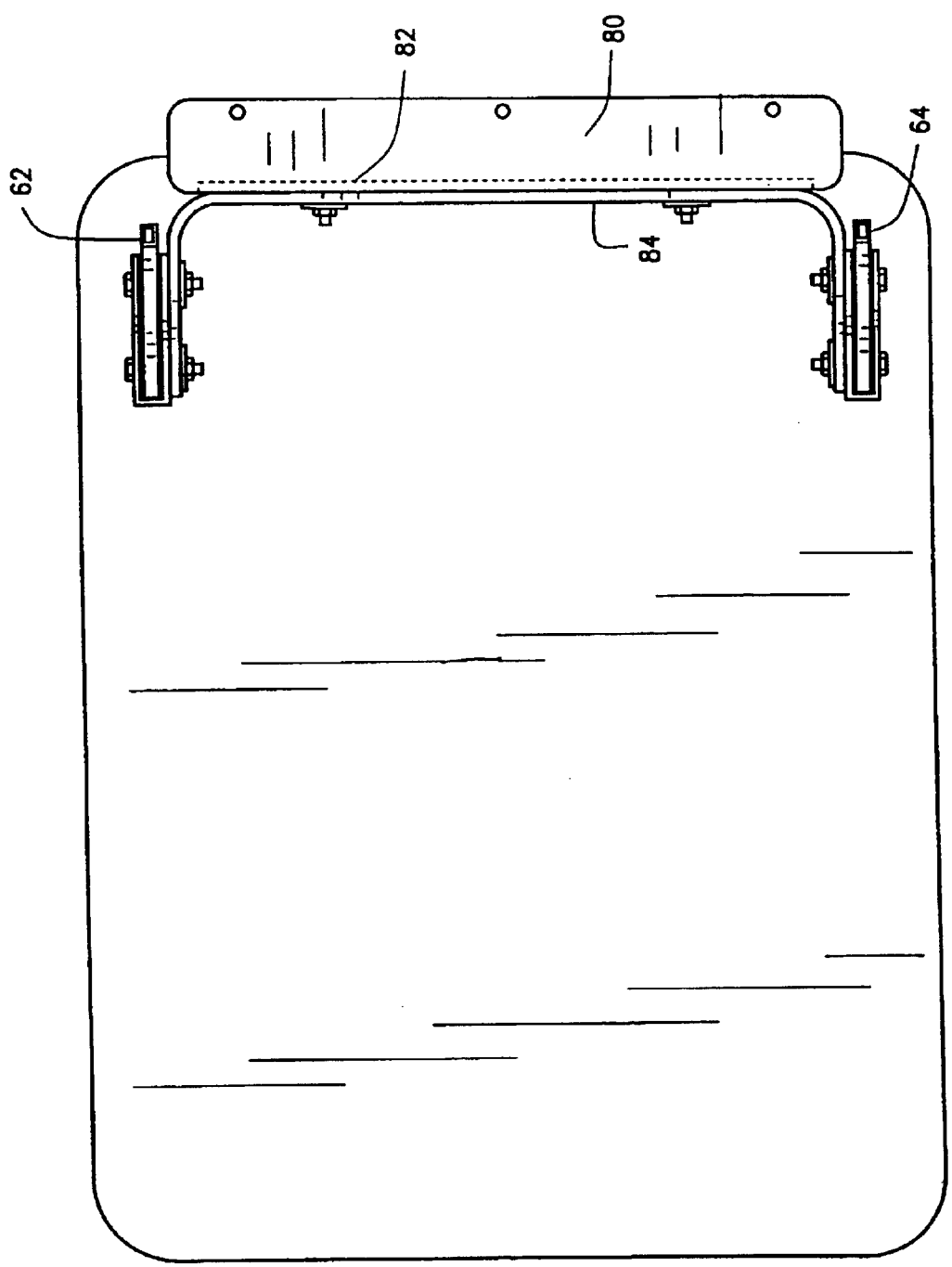
FIG. 17 is a bottom view of a canopy top for a golf car detailing the top mounting bracket bolted to the vertical support posts of a car as well as the transition plate.
Figure 18:
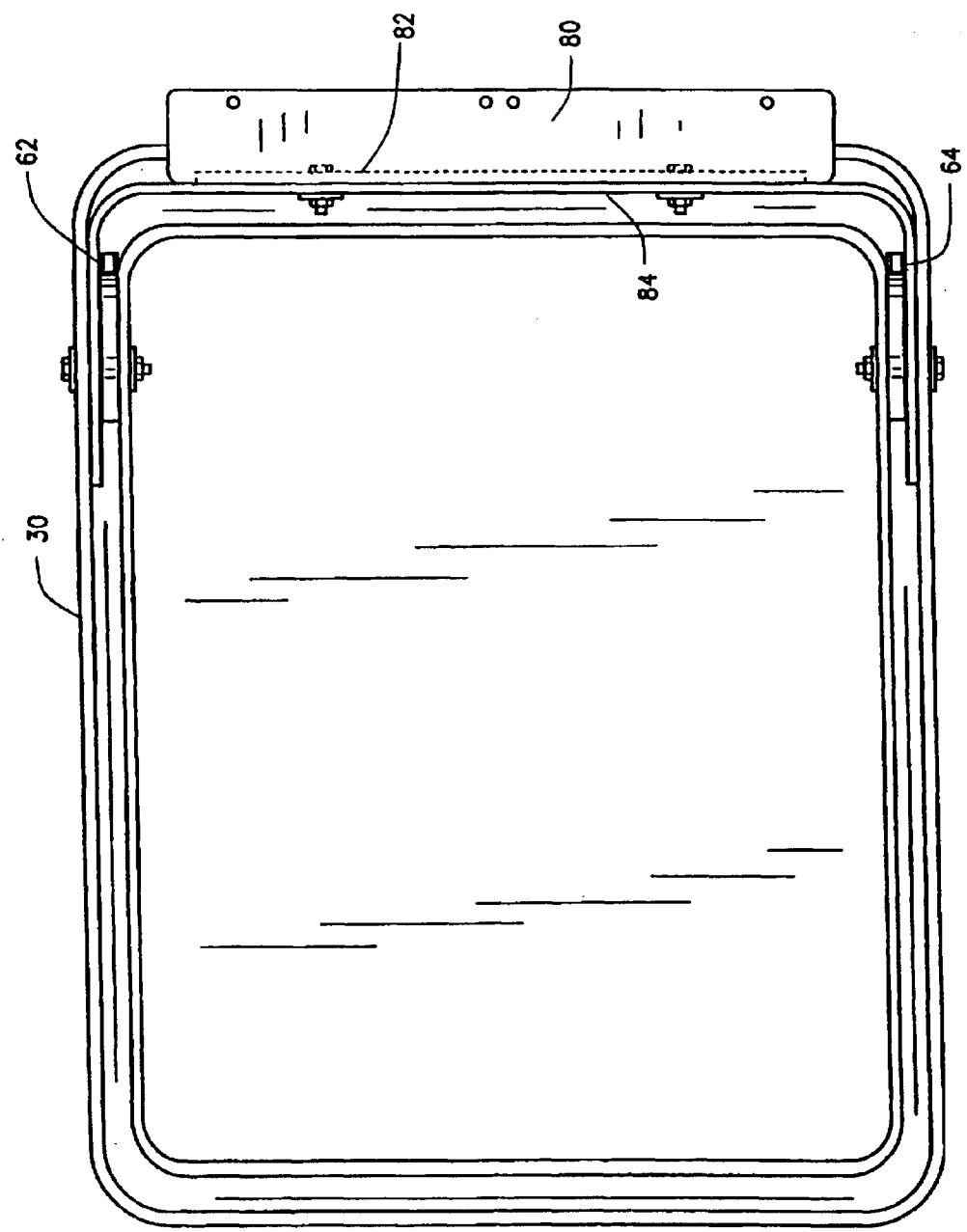
FIG. 18 is a bottom view of a canopy top of a golf car different than that shown in FIG. 17 and detailing the location of the top mounting bracket in a different arrangement.

As shown in FIGS. 17 and 18, bracket 84 may be provided in different form to suit the canopy top arrangement as used by different manufacturers. In the arrangement as shown in FIG. 17, top mounting bracket 84 conveniently mounts with the existing pair of bolts at either side thereof to the vertical support posts 62, 64 and at their inner surfaces. On the other hand, as shown in the arrangement of FIG. 18, top mounting bracket 84 may conveniently fit between vertical support posts 62 and the plastic canopy cover 30 and, again, be held in place by bolted connections as shown. In either arrangement, top mounting bracket 84 provides a convenient flat planar surface against which the upturned flange 82 of transition plate 80 may be readily abutted and mounted with its own mounting bolts to provide a secure connection between the awning cover and the supporting framework of the golf car top assembly.

Use

The retractable awning of the present invention provides a useful attachment to the rear of a golf car to keep equipment dry during rainy periods. It is very simply employed by pulling apart the rib members in fan-like fashion to create the arcuate structure of the awning. When a golfer needs to access her equipment and reach for a club, she need merely raise the edge of the awning to a sufficient degree to be able to reach in to the golf bag. When the rainy conditions no longer exist, the framework is simply pivoted into its closed retracted state. The nesting arrangement of the rib members allows for a neat, compact arrangement. Gathering flap 76 is then wound around the rib members to neatly bundle the fabric material. The awning of the instant invention, however, need not only be used for rainy conditions; it can also be used as a screen to protect the car occupants from the rays of the sun and or very windy days. Thus, the awning can be kept in its open deployed state all the time. If desired, a window 78 may be formed in the rear of the awning using transparent plastic or the like and a pocket or sleeve with transparent window may be provided for the ready insertion of advertising or signage.

Figure 16:
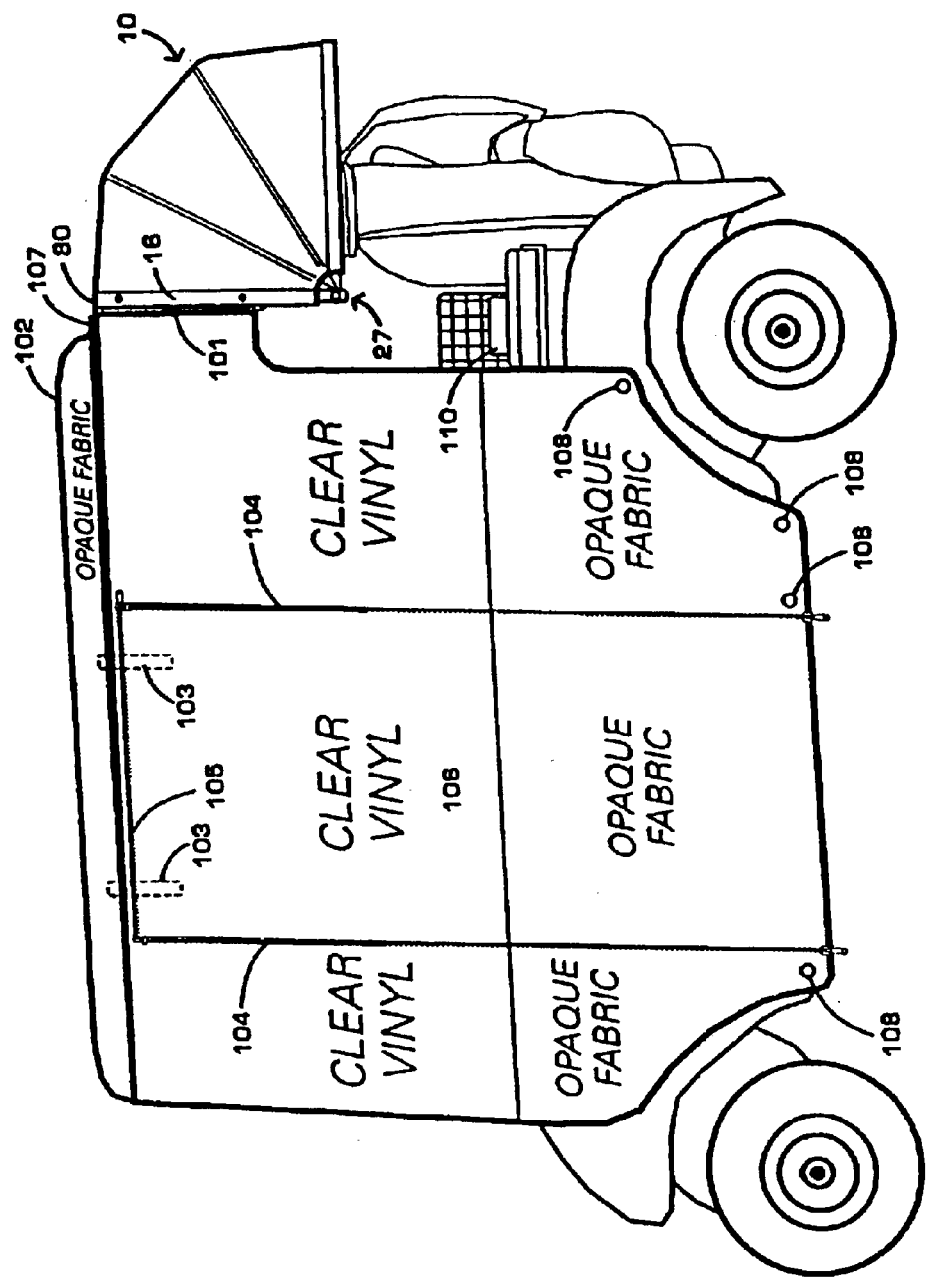
FIG. 16 is a side elevational view of a golf car with a total enclosure and an awning cover mounted to the back of the golf car.

As shown in FIG. 16, the awning cover 10 is readily adaptable to being used with a total enclosure and which provides an all weather enclosure for the golf car. Additionally, in accordance with the present invention, a full enclosure protective covering 200 is provided that may be integrated with many styles of rear bag covers 201 for a versatile and aesthetically appealing protective covering suited for any climate and weather condition. Thus, among the aspects of the present invention is a protective passenger compartment covering which may be easily integrated with a rear bag cover and easily retrofitted onto many makes and models of existing golf cars.

Figure 19:
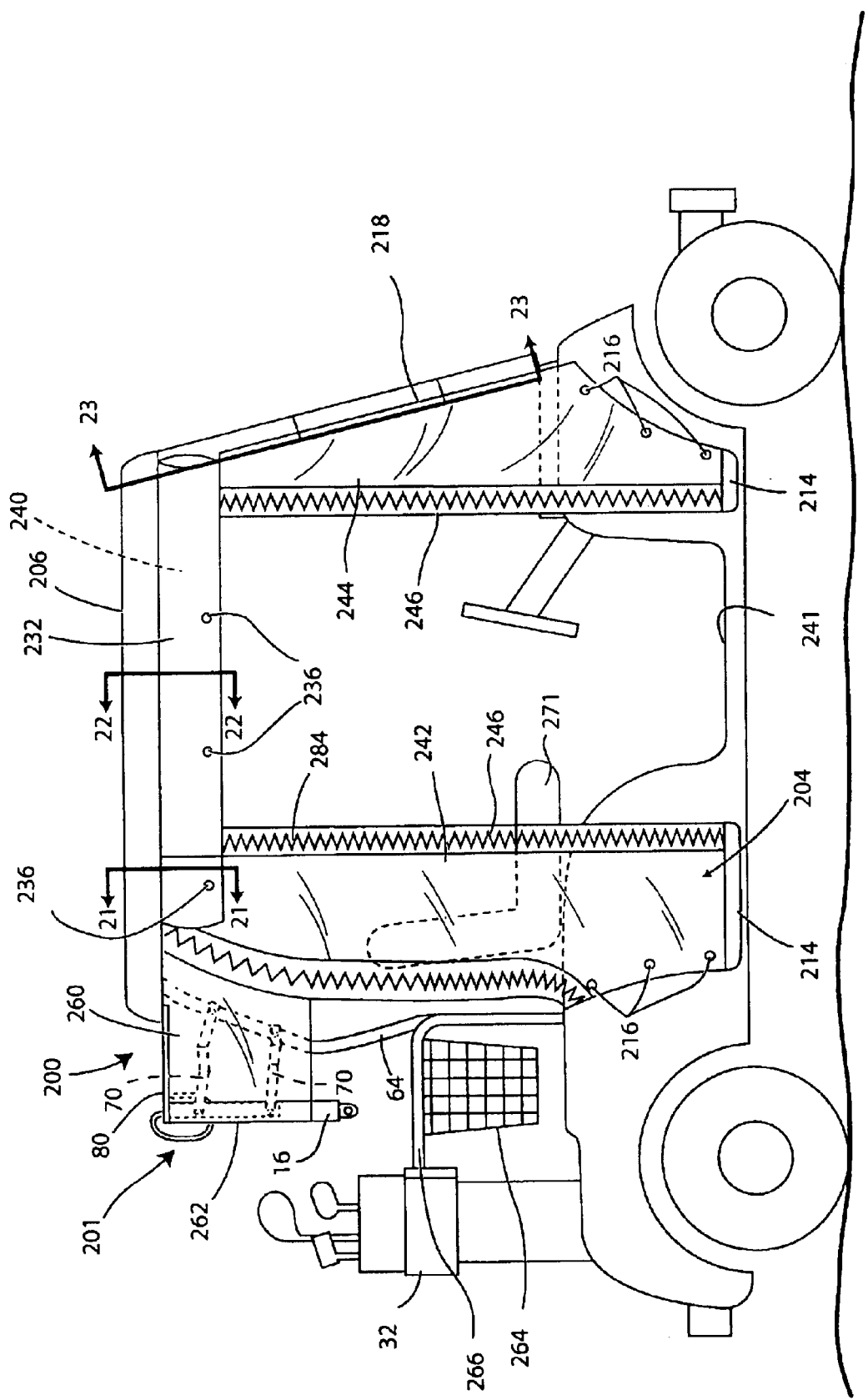
FIG. 19 is a side view of a golf car outfitted with a protective covering of the present invention.
Figure 20:
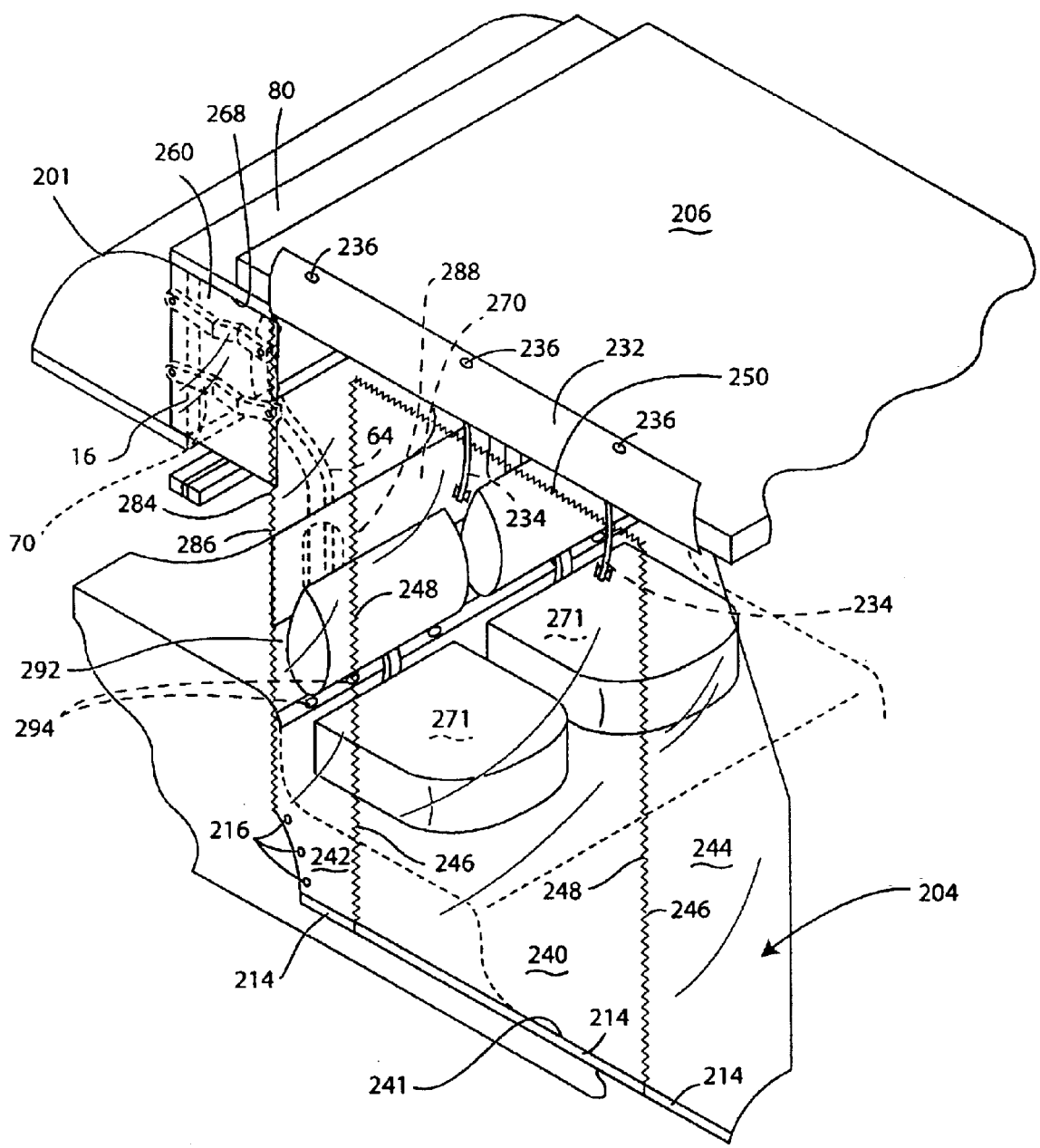
FIG. 20 is a partial perspective view of a golf car with an alternate embodiment of the protective covering of FIG. 19.

FIGS. 16, 19 and 20 show a full enclosure protective covering 200 in accordance with the present invention that comprises left and right side curtains 202,204 which extend vertically from the canopy on the left and right sides (driver and passenger sides) of the golf car. Preferably, the construction of the left and right side curtains 202,204 is the same with the left and right side curtains being mirror images of each other. Thus, for simplicity, only one side curtain will be described in detail.

Figure 22:
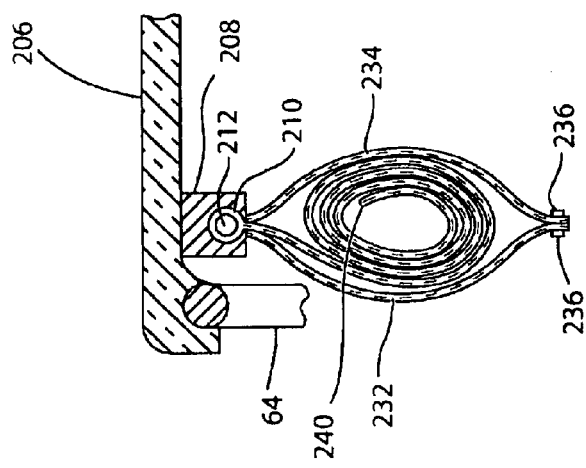
FIG. 22 is a partial cross sectional view of a side curtain of the protective covering taken along line 22-22 of FIG. 19.
Figure 21:
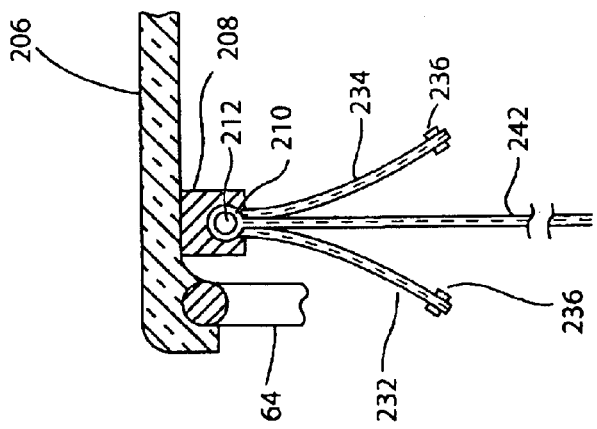
FIG. 21 is a partial cross sectional view of a side curtain of the protective covering taken along line 21-21 of FIG. 19.

The side curtain 204 is preferably removably attached to an underside of the canopy 206 at a peripheral side edge of the canopy (FIGS. 21,22). Preferably, the canopy underside is provided with a "C"-shaped channel 208 extending lengthwise on its peripheral edge, and the side curtain 204 has its top most edge formed with a gather or several folds of fabric sewn together or with a dowel sleeve 210. The dowel sleeve is inserted into the "C"-shaped channel and a dowel 212 is inserted into the sleeve to hold the curtain in its suspended position adjacent the side of the passenger compartment of the golf car. Other means of removably securing the side curtain may also be employed, including the use of a zipper or hook and loop fastening mechanisms such as Velcro™.

Preferably, the side curtain 204 is maintained taut against the golf car to enhance its aesthetic appeal and to maintain the passenger compartment sufficiently enclosed or sealed (FIGS. 19, 20). The side curtain may be provided with a sleeve 214 at its bottom edge with a stiffening member or weight in the sleeve to urge the side curtain 204 downward and against the body of the golf car. Snaps 216 and/or other mechanical fasteners such as zippers or hook and loop fasteners may be used to keep the peripheral edges of the side curtain or portions thereof adjacent the body of the golf car.

Figure 23:
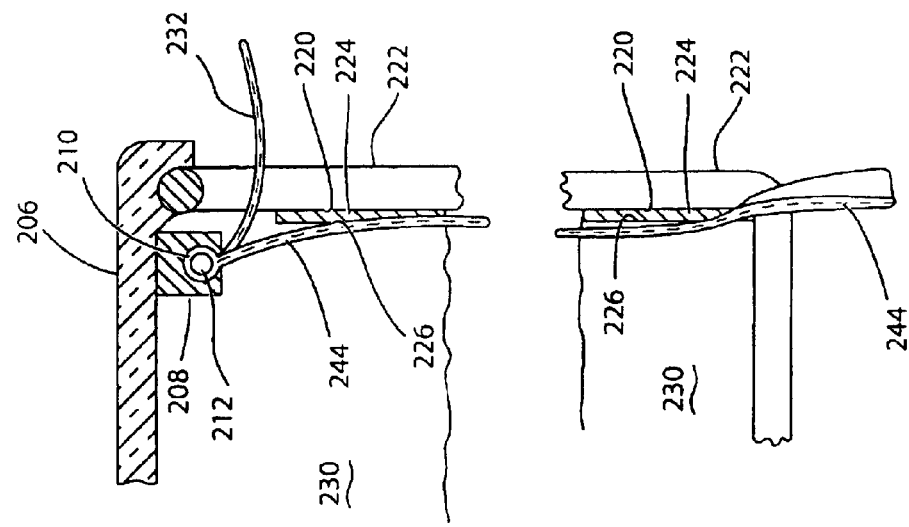
FIG. 23 is a partial cross section view of a side curtain of the protective covering taken along line 23-23 of FIG. 19.

For instance as shown in FIG. 23, for an aesthetically pleasing appearance, a forward vertical edge 218 of each side curtain may be attached to an inside 220 of a vertical support post 222 of the golf car with hook and loop fasteners. The hook material 224 may be arranged in a strip on the inside 220 of the vertical support post and the loop material 226 may be arranged on the forward vertical edge 218 of the side curtain. By placing the hook and loop fasteners 224,226 to the inside, the fixtures for attaching the windshield 230 to the vertical supports remain unobstructed and accessible and the overall appearance of the golf car remains neat and streamlined.

To allow the protective covering 200 to be used in all climate conditions and thus permanently attached to the golf car, the side curtain 204 is preferably movable between a raised position to expose the passenger compartment and a lowered position to protect the passenger compartment. In the raised position, the side curtain 204 is rolled-up adjacent the canopy 206 and in the lowered position, the side curtain is unfurled to hang from the canopy. To hold the side curtain in the raised position, a gathering flap 232, straps 234 and cooperating snaps 236 are provided. The gathering flap 232 attaches to the outside of the side curtain 204 and the straps 234 attach to the inside of the side curtain so that when the side curtain is rolled up, the flap partially surrounds the rolled up side curtain and is held in place adjacent the canopy with the straps (FIGS. 21,22). Preferably, the gathering flap 232 and straps 234 are stitched along the seam forming the dowel sleeve. Also, preferably, the gathering flap extends downward from the canopy a distance sufficient to permit holding the rolled-up side curtain while not unnecessarily obstructing the field of view from the passenger compartment. Additionally, the gathering flap is preferably placed on the outside of the side curtain to enhance the overall aesthetic appeal of the protective covering.

Preferably, the side curtain 204 has a door 240 that permits access to the passenger compartment without manipulation of the side curtain. Preferably, the side curtain extends along the entire passenger compartment whereas the door 240 extends along a smaller area, preferably a footwell 241 of the passenger compartment (FIGS. 19, 20). The door 240 adds to versatility of the protective covering in that it provides more protection from the elements than would otherwise be provided from the raised side curtain but easier access to the golf car than would otherwise be provided by manipulating the relatively large side curtain. Preferably, the side curtain 204 is formed with a rear portion 242 and a front portion 244 with the door 240 positioned between the two. This arrangement provides the sufficient protection for the passenger compartment with sufficient egress/ingress to the golf car. The door 240 is preferably movable between a raised position and lowered position in the same manner described above for the side curtain and may be held in the raised position with the same gathering flap 232 and straps 234. As may be desired, the door may be moved independently of the side curtain or the rear and front portions thereof. Preferably, the door 240 is removably attached to the side curtain using zippers 246 or other types of mechanical fasteners. As shown in FIG. 20, the door has a zipper connection 246 with the side curtain on each of its vertical sides 248 and across its top 250. Thus, the rear portion 242 and door 240 may be moved to the raised position independent of the front portion 244, the front portion and door may be moved to the raised position independent of the rear portion and the door may be moved to its raised position independent of the rear and front portions. These features add to the all-climate versatility of the protective covering. As may be desired, the door 240 may be completely unzipped from the side curtain, rolled up, and stored, for example, under the seats of the golf car.

Figure 24:
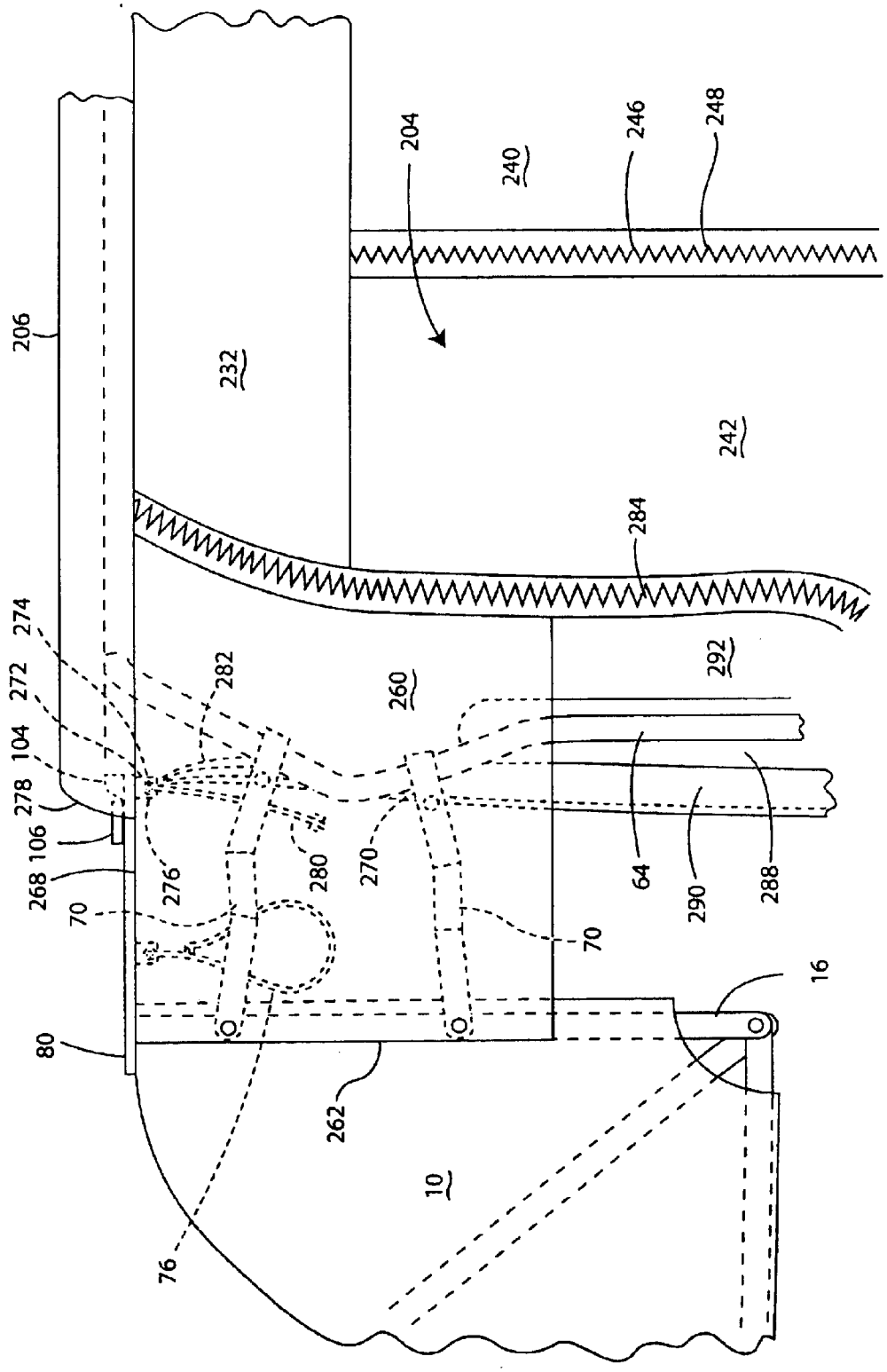
FIG. 24 is an enlarged partial view of a rear side flap of the protective covering of FIG. 19.

The side curtain 204 preferably further comprises a rear side flap 260 that extends from the side curtain 204 to the rear bag cover 201. As shown in FIGS. 16, 24, the rear side flap extends from the rear portion to the first vertical rib member 16 of the awning 10. In this way the rear side flap covers over the brackets 70 used to mount the awning to the rear vertical supports 64 of the golf car. Additionally, the rear side flap 260 provides a streamlined profile for the golf car as the protective covering transitions from the side curtain 204 to the rear bag cover 201. Preferably, the rear edge 262 of the rear side flap attaches to the vertical rib member using mechanical fasteners such as a zipper, Velcro™ or snaps. For instance, for ease of installation, the mechanical fasteners used to secure the mounting brackets to the awning may have their heads provided with snaps to engage the rear side flap side edge.

Preferably, the rear side flap 260 extends downward a distance sufficient to cover over the area between the passenger compartment and rear golf bag storage compartment (FIG. 19). In this area, a sweater basket 264 for the golf car is generally provided. Additionally, as described in several others of the inventor's patent applications, the rear vertical support posts 64 and supports 266 for the sweater basket provide a convenient place to locate golf accessories such as coolers, ball washers, and divot mix containers. Thus, the rear side flap 260 extends downward a distance sufficient to protect this area from overhead exposure while permitting easy access from the side of golf car. Preferably, a top edge 268 of the rear side flap runs along the canopy 206 and/or transition plate 80 (if equipped) to provide an adequate protection for the area behind the passenger compartment seats.

Figure 25:
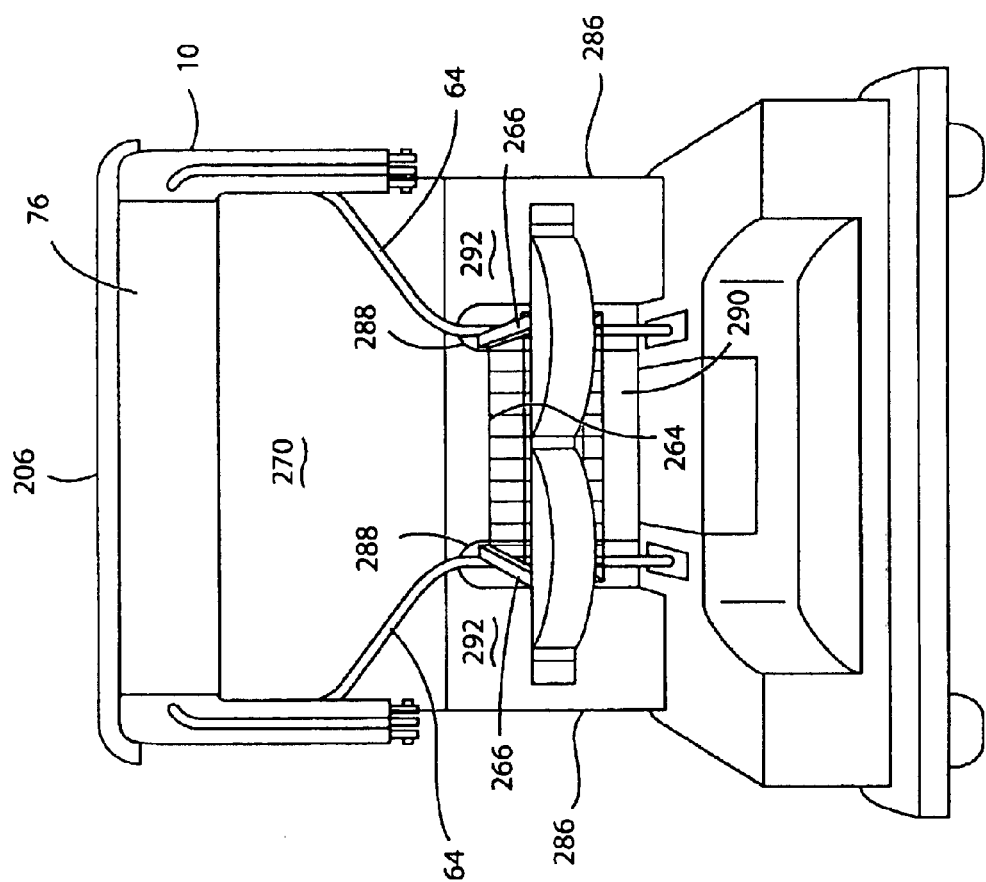
FIG. 25 is a rear view of a golf car outfitted with a protective covering of the present invention.

Preferably, the protective covering 200 is provided with a rear curtain 270 or valence that is positioned behind the seats 271 between the passenger compartment and the rear golf bag storage compartment (FIGS. 20, 25). The rear curtain 270 provides separation between the passenger compartment and the rear golf bag storage compartment and protects the passenger compartment while permitting access to locations at the rear of the golf car. The protective cover for the golf car may or may not include the rear curtain, and to allow for all-climate versatility, the rear curtain is preferably removably attached to the golf car in an area adjacent the canopy. For those golf cars equipped having a rear bag cover 201 and a transition plate 80 between the canopy 206 and the rear bag cover 201, the rear curtain 270 may be attached to the transition plate. For other golf cars not having a rear bag cover or transition plate, the rear curtain 270 may be attached to the canopy itself. Preferably, the rear curtain 270 is attached to the golf car using the "C"-shaped channel 272, dowel 274, and sleeve 276 described previously. Thus, the "C" shaped channel is provided on either the underside of the transition plate 80 adjacent the in-turned flange 104 or on the underside of the canopy at its rear peripheral edge 278.

To provide added versatility for the protective covering, the rear curtain 270 may be moved between a raised position and a lowered position in much the same way as the side curtain 204 previously described. Thus, depending upon whether a transition plate 80 is used, the rear curtain in the raised position will either be rolled up adjacent the canopy or the transition plate. A gathering flap 280 and cooperating straps 282 are provided on the rear curtain to allow the rear curtain to be rolled up to the canopy as desired. Preferably, the gathering flap 280 is arranged on the outside or the rear of the rear curtain and the straps 282 are arranged on the inside or the front of the rear curtain to enhance the aesthetic appeal of the protective covering. The gathering flap and straps may be stitched along the seams forming the dowel sleeve 276 at the top of the rear curtain. Preferably, the gathering flap 280 extends downward a length sufficient to allow it to hold the rolled-up rear curtain adjacent the canopy while not unnecessarily restricting the view from the rear of the passenger compartment.

To provide a sufficient enclosure for the passenger compartment, the rear curtain 270 is preferably releasably attached to each of the side curtains 202,204. Preferably, a zipper connection 284 is provided along each vertical edge of the rear curtain 270 and the adjacent rear vertical edge of the respective side curtain. Thus, when it is desired to move the side curtain to its raised position, the user may merely unzip the side curtain from the rear curtain and raise the side curtain with the rear curtain in its lowered position.

To enhance the aesthetic appeal of the protective covering and to maintain sufficient protection from the elements, it is desired to maintain the rear curtain 270 taut between canopy or transition plate and the body of the golf car. Additionally, it is desired for the rear curtain to fit neatly with the structure of the golf car, and more specifically, the pair of spaced apart vertical support posts 64 commonly found at the rear of the golf car. Thus, a pair of vertical slots 288 are provided through a bottom edge of the rear curtain, which, in effect divide a lower portion of the rear curtain 270 into three sections with a center section 290 fitting between the spaced apart vertical support posts (FIGS. 20,25). The outer sections 292 may then be directed to an area behind the seats 271 of the passenger compartment where they may held to the body of the golf car using mechanical fasteners such as snaps 294.

To enhance the aesthetic appeal of the protective covering, each of the above described curtains 202,204,270 may be constructed using a dear vinyl for the top portion of the curtain for adequate visibility and a fabric or canvas for the lower portion.

Additionally, it should be noted that the protective cover described herein may used with any type of various coverings for the rear golf bag storage compartment, including the retractable awning described herein. Additionally, it should be appreciated that when a rear bag cover is incorporated into the protective covering, the rear bag cover can attach directly to canopy or extend out from canopy with a transition plate as described herein.

Various other changes and modifications may be made within this invention as will be apparent to those skilled in the art. Such changes and modifications are within the scope and teaching of this invention as defined in the claims appended hereto.

What is claimed is:

1. A combination protective cover for a golf car that has a rigid canopy supported by at least one front support post and one rear support post over a passenger compartment of the golf car and a rear golf bag storage area located behind the passenger compartment the combination comprising:

a protective compartment cover having left and right side curtains that are adapted to hang from the canopy and enclose a portion of the passenger compartment, the side curtains being separate panels adapted to extend along respective sides of the passenger compartment from a front of the golf car to an area immediately behind the passenger compartment; and a protective bag cover comprising a frame and a fabric covering overlying the frame having front and rear edges, the frame being movable between an extended position in which the golf bag storage area is covered and a retracted position in which the golf bag storage area is exposed, the fabric covering front edge being operatively connected with the canopy, the bag cover fabric covering extending from the front edge over the golf bag storage area to the rear edge with the rear edge being suspended in a position above the golf bag storage area in the extended position of the frame, and the fabric covering being substantially folded with the rear edge being positioned substantially adjacent the front edge in the retracted position of the frame; and further comprising, a pair of rear side flaps adapted to extend between each of the side curtains and the bag cover front edge on opposite sides of an area of the golf car between the passenger compartment and the golf bag storage area, the rear side flaps having opposite top and bottom edges and extending downward a distance that partially covers over the area between the passenger compartment and the golf bag storage area while permitting access to the area between the passenger compartment and the golf bag storage area from beneath the bottom edges of the rear side flaps.

2. The combination of claim 1, further comprising:

brackets that mount the bag cover to the at least one rear support post of the golf car and the rear side flaps being dimensioned to cover over the brackets.

3. The combination of claim 1, further comprising:

the rear side flaps providing a uniform appearance as the left and right side curtains transition to the bag cover.

4. The combination of claim 1, further comprising:

at least one of the left and right side curtains having a gathering flap and a cooperating strap that are dimensioned to extend around a rolled up side curtain and connect with each other to support the side curtain adjacent the canopy.

5. The combination of claim 1, further comprising:

at least one of the left and right side curtains having a door that can be rolled up to a position adjacent the canopy independent of the side curtain.

6. The combination of claim 5, further comprising:

the door being removably attached to the side curtain.

7. The combination of claim 6, further comprising:

the side curtain having a front portion and a rear portion and the door being between the front and rear portions, the front portion being adapted to be removably attached inside the front support post of the golf car, the rear portion being adapted to be removably attached to the golf car in an area immediately behind the passenger compartment.

8. The combination of claim 1, further comprising:

at least one of the left and right side curtains being removably attached to the canopy.

9. The combination of claim 8, further comprising:

the passenger compartment canopy having a peripheral edge and a "C"-shaped channel extending along at least a portion of the peripheral edge on an underside of the canopy;

at least one of the left and right side curtains having a top edge with a gather along the top edge that is dimensioned to be inserted in the "C"-shaped channel, removably attaching the curtain to the canopy.

10. The combination of claim 1, further comprising:

each of the left and right side curtains has a bottom edge with fasteners along the bottom edge that are removably attachable to the golf car to hold the left and right side curtains taut between the canopy and the golf car.

11. The combination of claim 1, further comprising:

a transition plate connected to the front edge of the bag cover and engaging with the canopy.

12. A protective cover for a golf car having a passenger compartment that is covered by a canopy supported by a pair of spaced apart support posts located at a rear portion of the canopy, the protective cover comprising:

left and right side curtains and a rear curtain extending between the left and right side curtains, each of the left and right side and rear curtains being adapted to hang from the canopy to enclose a portion of the passenger compartment, the rear curtain being adapted to hang from the canopy in a manner such that the rear curtain is positioned immediately behind the passenger compartment adjacent the pair of spaced apart support posts, and the rear curtain having a bottom edge and at least two vertical slots through the bottom edge that receives the pair of support posts of the golf car.

13. The protective covering of claim 12, further comprising:

at least one of the left and right side curtains being removably attached to the rear curtain in enclosing the passenger compartment.

14. The protective covering of claim 12, further comprising:

the rear curtain having a top edge with a releasable fastener mechanism attaching the top edge to the canopy and a bottom edge with a releasable fastener mechanism attaching the bottom edge with a releasable fastener mechanism attaching the bottom edge to the golf car whereby a portion of the rear curtain is held taut between the canopy and the golf car at an area behind the passenger compartment.

15. The protective covering of claim 12, further comprising:

the rear curtain being removably attached to the canopy.

16. The protective covering of claim 15, further comprising:

the passenger compartment canopy having a peripheral edge and a "C"-shaped channel extending along at least a portion of the peripheral edge on an underside of the canopy;

at least one of the left and right side curtains having a top edge with a gather along the top edge that is dimensioned to be inserted in the "C"-shaped channel, removably attaching the curtain to the canopy.

17. The protective covering of claim 12, further comprising:

at least one of the left and right side curtains having a gathering flap and a cooperating strap that are dimensioned to extend around a rolled up side curtain and connect with each other to support the side curtain adjacent the canopy.

18. The protective covering of claim 12, further comprising:

the rear curtain being shaped to fit between seats of the passenger compartment and a basket mounted on the pair of spaced apart support posts, whereby a user of the golf car has unobstructed access to the basket and other accessories mounted thereabout.

19. A protective cover for a golf car wherein the golf car has a passenger compartment, a rear golf bag storage area and a canopy over the passenger compartment that is supported by a pair of spaced apart support posts located at a rear portion of the canopy and between the passenger compartment and the rear golf bag storage area, the protective cover comprising:

left and right side curtains and a rear curtain extending between the left and right side curtains, each of the left and right side curtains being adapted to hang from the canopy to enclose a portion of the passenger compartment, the rear curtain being adapted to be positionable between the passenger compartment and the rear golf bag storage area of the golf car adjacent the pair of spaced apart support posts; and a rear bag cover having front and rear edges, the front edge being operatively connected with the canopy, the rear bag cover being positionable between a retracted position in which the rear golf bag storage area is exposed and a deployed position in which the rear golf bag cover covers over the rear golf bag storage area with the rear edge suspended in a position above the rear golf bag storage area;

the rear bag cover being adapted to be attached to and solely supported by the support posts; and a transition plate extending between the rear bag cover and the canopy, the transition plate having an upturned flange that fits under a lip of the canopy to provide an overlapping joint between the transition plate and the canopy, and the rear curtain being removably attached to and adapted to hang from the transition plate.

20. The protective cover of claim 19, further comprising:

the transition plate forward end having a peripheral edge and a "C"-shaped channel extending along at least a portion of the peripheral edge on an underside of the canopy; and at least one of the left and right side curtains having a top edge with a gather along the top edge that is dimensioned to be inserted into the "C"-shaped channel removably attaching the rear curtain to the transition plate.

21. The protective cover of claim 20, further comprising:

the rear bag cover having a gathering flap adapted to surround the rear bag cover in the retracted position of the rear bag cover to hold the bag cover adjacent the transition plate;

the transition plate being formed with a second a "C"-shaped channel; and the gathering flap having a top edge with a gather along the top edge that fits into the second "C"-shaped channel to removably attach the gathering flap to the transition plate.

22. The protective cover of claim 19, further comprising:

the rear curtain having a gathering flap and a cooperating strap that are dimensioned to extend around a rolled up side curtain and connect with each other to support the rear curtain adjacent the transition plate.

* * * * *